United States Patent [19]
Takahashi et al.

[11] Patent Number: 5,838,886
[45] Date of Patent: Nov. 17, 1998

[54] PRINTING METHOD AND APPARATUS THEREFOR

[75] Inventors: Tsutomu Takahashi, Kawasaki; Susumu Takase; Naohisa Suzuki, both of Yokohama; Koji Fukunaga, Tokyo; Masaki Nishiyama; Jiro Tateyama, both of Yokohama; Hisatsugu Naito, Tokyo, all of Japan

[73] Assignee: Canon Kabushiki Kaisha, Tokyo, Japan

[21] Appl. No.: 921,701

[22] Filed: Sep. 30, 1992

[30] Foreign Application Priority Data

Jul. 30, 1991 [JP] Japan ................................. 3-190338
Jul. 30, 1991 [JP] Japan ................................. 3-190339
Jul. 30, 1991 [JP] Japan ................................. 3-190343

[51] Int. Cl.$^6$ ..................................................... G06K 15/00
[52] U.S. Cl. ................................... 395/112; 395/101
[58] Field of Search ...................... 395/112, 113, 395/101, 114, 107, 109, 115, 116, 111, 108, 105–106, 830; 400/669; 340/653; 358/401, 404, 444, 406, 474, 437, 296

[56] References Cited

U.S. PATENT DOCUMENTS 4,740,096  4/1988  Nakanishi ............................... 400/663
5,347,265  9/1994  Shimura ................................... 340/653

*Primary Examiner*—Edward L. Coles, Sr.
*Assistant Examiner*—Dov Popovici
*Attorney, Agent, or Firm*—Fitzpatrick, Cella, Harper & Scinto

[57] ABSTRACT

A printing method and apparatus according to the present invention is capable of instructing whether or not a printing portion is used in a case where data is received from a host so as to be printed, and the initializing control required to perform printing can be skipped at the time of power supply if the printing portion is not used, or arranged to store a fact whether or not initialization has been performed so that whether or not the initialization is performed is controlled at the time of the power supply or when a printing opportunity has been issued.

13 Claims, 29 Drawing Sheets

PRINTING METHOD AND APPARATUS THEREFOR

BACKGROUND OF THE INVENTION

1. Field of the Invention

The present invention relates to a printing method for performing initialization and an apparatus therefor.

2. Related Background Art

Hitherto, printing apparatus have been so arranged that initialization, in which, for example, the carriage is moved to the home position, is performed whenever power is supplied thereto.

Hence, the printing of an information apparatus of a type having a built-in printing unit is uselessly initialized though the printing apparatus is not used in the subject operation.

In particular, a lap-top computer driven by a battery encounters a critical problem taken place in that the life of the battery can be shortened due to the initialization of the printing apparatus.

SUMMARY OF THE INVENTION

Accordingly, an object of the present invention is to provide a printing method and an apparatus provided with a mode for turning on/off the printer thereof and having a switch means for switching the mode between the mode in which the printer is turned on and a mode in which the printer is turned off so that the initialization at the time of the power supply can be omitted when the mode in which the printer is turned off is selected.

Accordingly, another object of the present invention is to provide a printing method and an apparatus having a means for discriminating whether or not the initialization at the time of the printing process has been completed so that the initialization is performed when a print command is issued and an output, which denotes a fact that the output from the discriminating means has not been completed, is made.

Accordingly, another object of the present invention is to provide a printing method and an apparatus having a non-volatile storage device for storing the initialized state of the printing portion so that the initialization can be omitted if it is unnecessary to be performed.

DESCRIPTION OF THE PREFERRED EMBODIMENTS

Preferred embodiments of the present invention will now be described with reference to the drawings.

Figure 1:
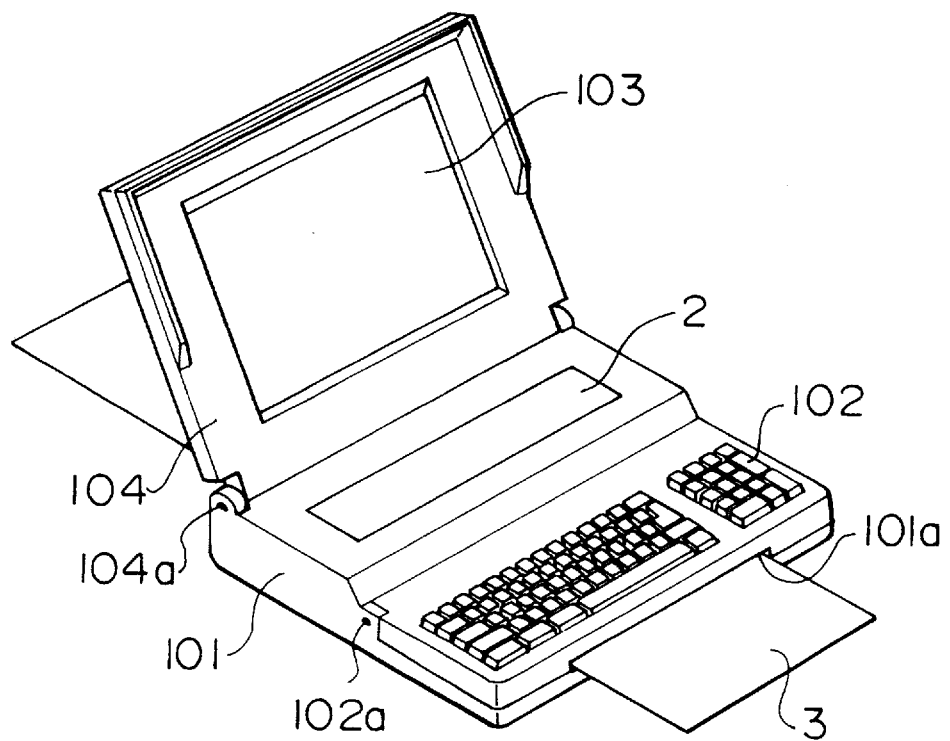
FIG. 1 is a perspective view which illustrates a personal computer having a printer included therein according to the present invention.

FIG. 1 is a perspective view which illustrates a personal computer having a printer formed therein, the personal computer serving as an information processing apparatus according to the present invention. The personal computer according to the present invention comprises an apparatus body 101, a keyboard 102, an upper cover 104 having a display portion 103, a printer 2, and the like. The upper cover 104 is so fastened to the apparatus body 101 that it is able to swing on hinges 104a disposed at the read end portions of the apparatus body 101. As a result, the upper cover 104 is swung to be opened to an angular degree at which the display portion 103 can be easily seen when the apparatus is intended to be used. When the apparatus is not used, the upper cover 104 is closed so as to serve as cover. As the display device of the display portion 103, a liquid crystal display device is employed because the thickness of the display portion 103 can be reduced.

The printer unit 2 having a recording head of the ink jet recording system is disposed in front of the display portion 103 while being accommodated in the apparatus body 101. The printer unit 2 has an opening portion (omitted from illustration) which can be opened/closed by an operator with which the recording head can be exchanged.

A recording paper sheet 3 is inserted through a paper supply port 101a formed below the keyboard 102, the recording paper sheet 3 being then passed through a conveyance passage which penetrates the apparatus body 101. Then, the recording paper sheet 3 is discharged through a discharge port (omitted from illustration) formed in the rear portion of the apparatus body 101. The keyboard 102 is so fastened that it is able to swing on hinges 102a disposed on the two side portions of the apparatus body 101. As a result, even if a recording paper sheet such as an envelope or a postcard having a relatively short length is used, it can be inserted deep into the conveyance passage by upwards opening the keyboard 102. Since the passage through which the recording paper sheet 3 is conveyed is formed below the keyboard 102 as described above, a variety of operations in which the keyboard 102 and the display portion 103 are used can be performed in a state where the recording paper sheet 3 is set.

A portion from which the printer unit 2 is omitted, that is, a so-called computer portion is called a "host computer" hereinafter.

[Schematic Block Diagram of Host-Printer]

Figure 2:
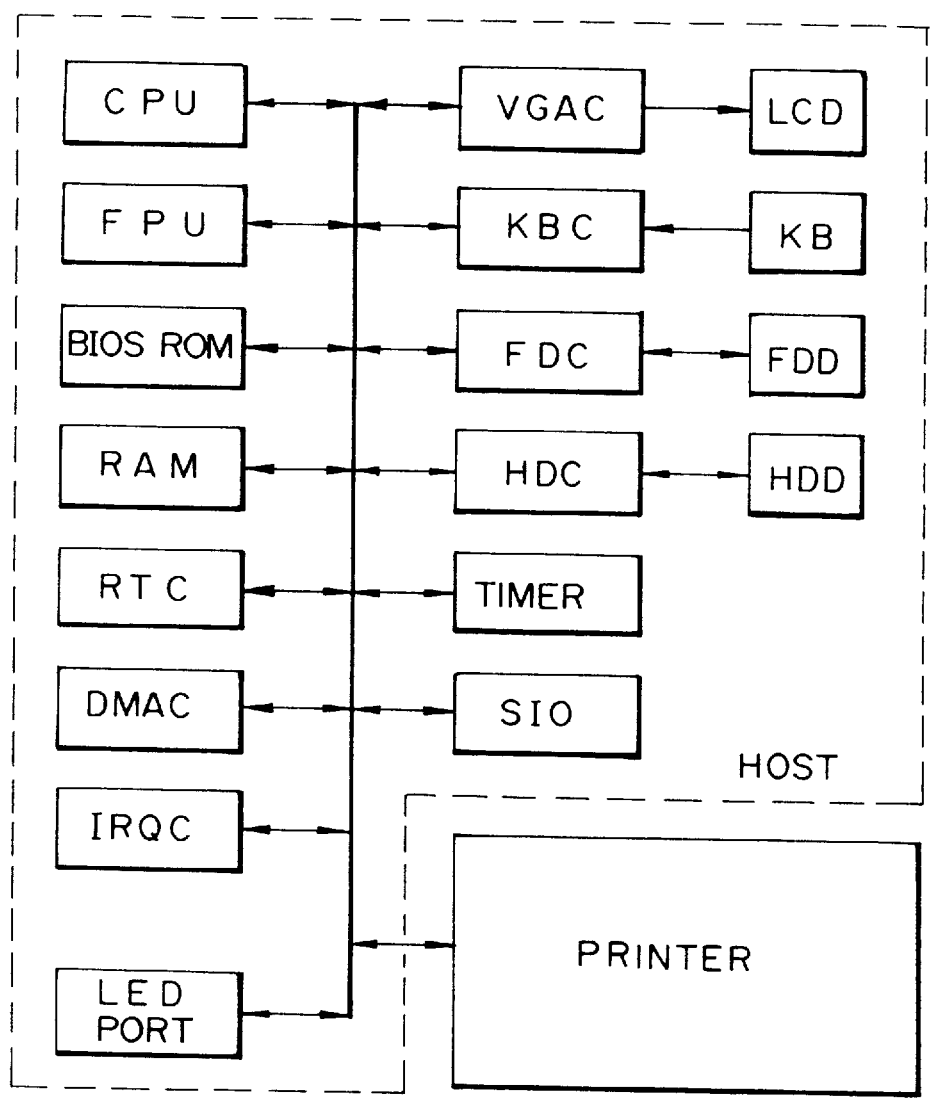
FIG. 2 is a schematic block diagram which illustrates a host computer and a printer.

FIG. 2 is a schematic block diagram which illustrates the host computer and the printer.

In the host computer, a central processing unit (CPU) which performs the main control operation, the basic control of which is instructed by a BIOS ROM (Basic Input Output System ROM. In this structure, an application program is read from a floppy disk (FDD) or a hard disk (HDD) via a floppy disk controller (FDC) or a hard disk controller (HDC), and the program is executed by utilizing a system memory (RAM). The screen display method is so arranged that a VGA (Video Graphic Array) controller (VGAC) is used to display characters or the like on the liquid crystal device (LCD). On the other hand, the key input by using the keyboard (KB) is performed via a keyboard controller (KBC). A figure operational processor (FPU) supports the operation process performed by the CPU. Furthermore, a real time clock (RTC) indicates the present lapse of time, the real time clock (RTC) being operated by an exclusive battery even if the power supply to the overall system is stopped. A DMA controller (DMAC) enables data to be transferred at high speed between memories, between the memory and an I/O, or between two I/Os while omitting the intervention of the CPU. An interruption controller (IRQC) receives interruption made through each I/O and processes it in accordance with the priority order. A timer (TIMER) includes a free running timer having a plurality of channels so as to perform various time controlling operations. Furthermore, a serial interface (SO) connected to the outside, an extension port (PORT) and an LED for informing the state of the operation to a user. The printer is connected to the host computer via a general-purpose parallel interface so as to transmit/receive data at the register level of the I/O port. The connection thus established is the similar level to that established when data is transmitted/received to and from an external printer.

Figure 3:
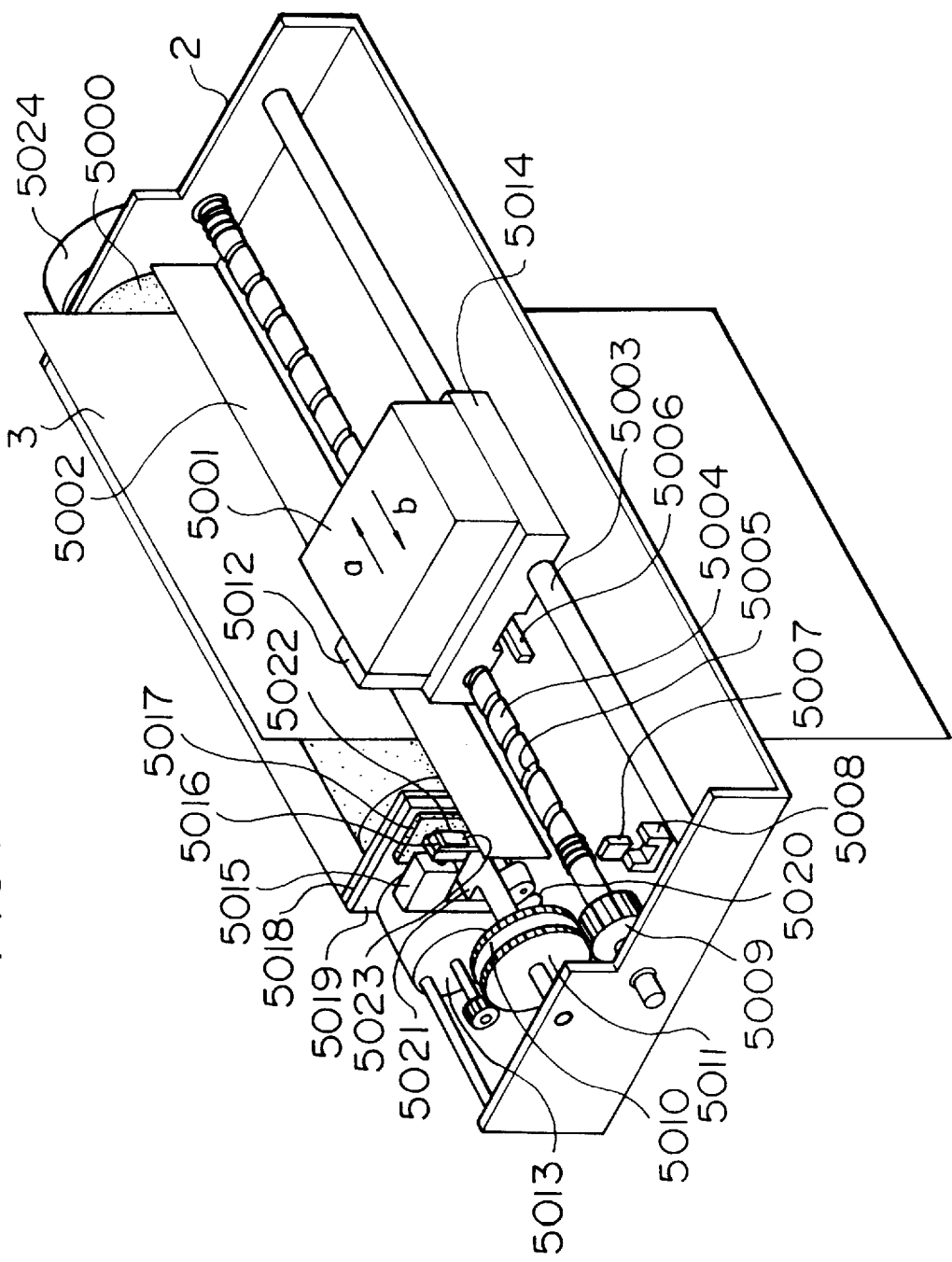
FIG. 3 illustrates the internal structure of the printer unit 2 shown in FIG. 1.

FIG. 3 is a perspective view which illustrates the internal structure of the printer unit 2 of a type adapted to the ink jet recording system and according to the present invention. Referring to FIG. 3, reference numeral 5001 represents an ink tank, and 5012 represents a recording head connected to the ink tank 5001. The ink tank 5001 and the recording head 5012 constitute an integral cartridge which can be exchanged arbitrarily. Reference numeral 5014 represents a carriage for fastening the cartridge to the printer body, and 5003 represents a guide for scanning the carriage in the sub-scanning direction.

Reference numeral 5000 represents a platen roller for scanning the recording paper sheet 3 in the main scanning direction. Reference numeral 5024 represents a paper sending motor for rotating the platen roller 5000. The carriage 5014 is so arranged that a flexible cable (omitted from illustration) for passing a drive signal pulse current and a head temperature adjustment current to the recording head 5012 is connected to a printed circuit board (omitted from illustration) having an electric circuit for controlling the printer.

The printer unit 2 thus structured will now be described further in detail. The carriage 5014 has a pin (omitted from illustration) so as to be reciprocated in directions designated by arrows a and b, the carriage 5014 being engaged to a spiral groove 5005 of a lead screw 504, which is rotated in synchronization with the forward/reverse rotations of the drive motor 5013 via a drive force transmission gears 5011 and 5009. Reference numeral 5002 represents a paper retainer plate for pressing the paper to the platen 5000 in a direction in which the carriage 5014 is moved. Reference numerals 5007 and 5008 represent photocouplers serving as home position detection means for, for example, switching the rotational direction of the motor 5013 by confirming the presence of a lever 5006 of the carriage 5014 in the aforesaid region. Reference numeral 5016 represents a member for supporting a cap member for capping the front surface of the recording head 5012. Reference numeral 5015 represents a suction means for sucking the inside portion of the cap member 5022 in such a manner that it sucking and recovering the recording head 5012 via an opening 5023 formed in the cap 5023.

Reference numeral 5017 represents a cleaning blade, and 5019 represents a member for enabling the blade 5017 to be moved in the front and rear directions, the cleaning blade 5017 and the member 5019 being supported by a body supporting plate 5018. The blade is not limited to the aforesaid arrangement and therefore a known cleaning blade may, of course, be used in the present invention. Reference numeral 5021 represents a lever for starting the sucking operation performed for the purpose of recovering the recording head 5012, the lever 5021 being moved when a cam 5020 engaged to the carriage 5014 is moved. The transmission of the drive force of the drive motor for moving the lever 5021 is controlled by a known transmission means such as a clutch.

That is, when the drive motor 5013 is reversely rotated from the home position for the carriage 5014, the power transmission gear 5011 is switched to 5010 (omitted from illustration), so that the drive force of the drive motor 5013 is transmitted to the lever 5021 via the cam 5020. As a result, capping, cleaning and suction-recovering the recording head 5012 are performed.

[Block Diagram of Printer]

Figure 4:
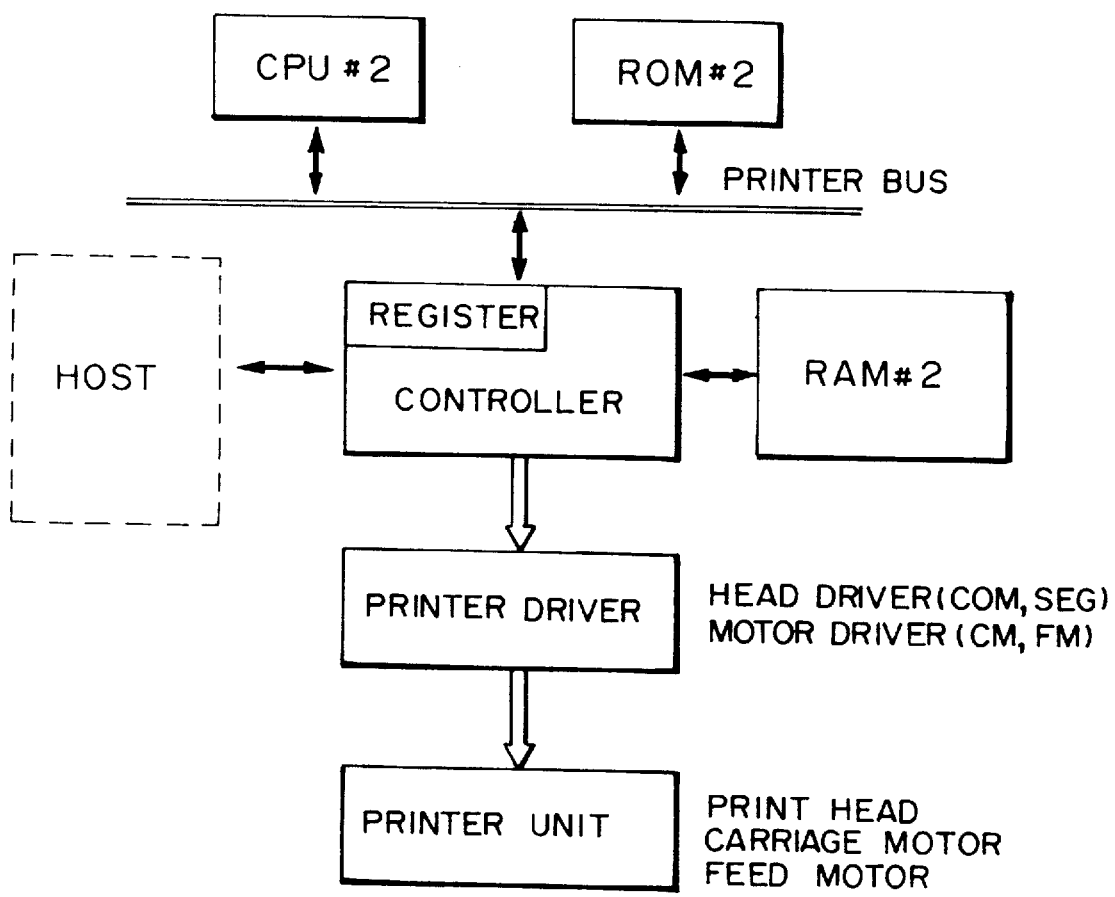
FIG. 4 is a block diagram which illustrates the printer.

FIG. 4 is a block diagram which illustrates the printer.

The printer comprises a second CPU for controlling the printer, a second ROM which stores a printer control program, a printer emulation and a print font, a second RAM in which development data for the printing operation and data supplied from a host computer are stored, a printer driver for driving the print head of the printer and for driving the motor, and a controller for controlling accessing to the memory, transmitting/receiving data to and from the host computer and transmitting a control signal to the printer driver.

[Structural View of Printer Driver]

Figure 5:
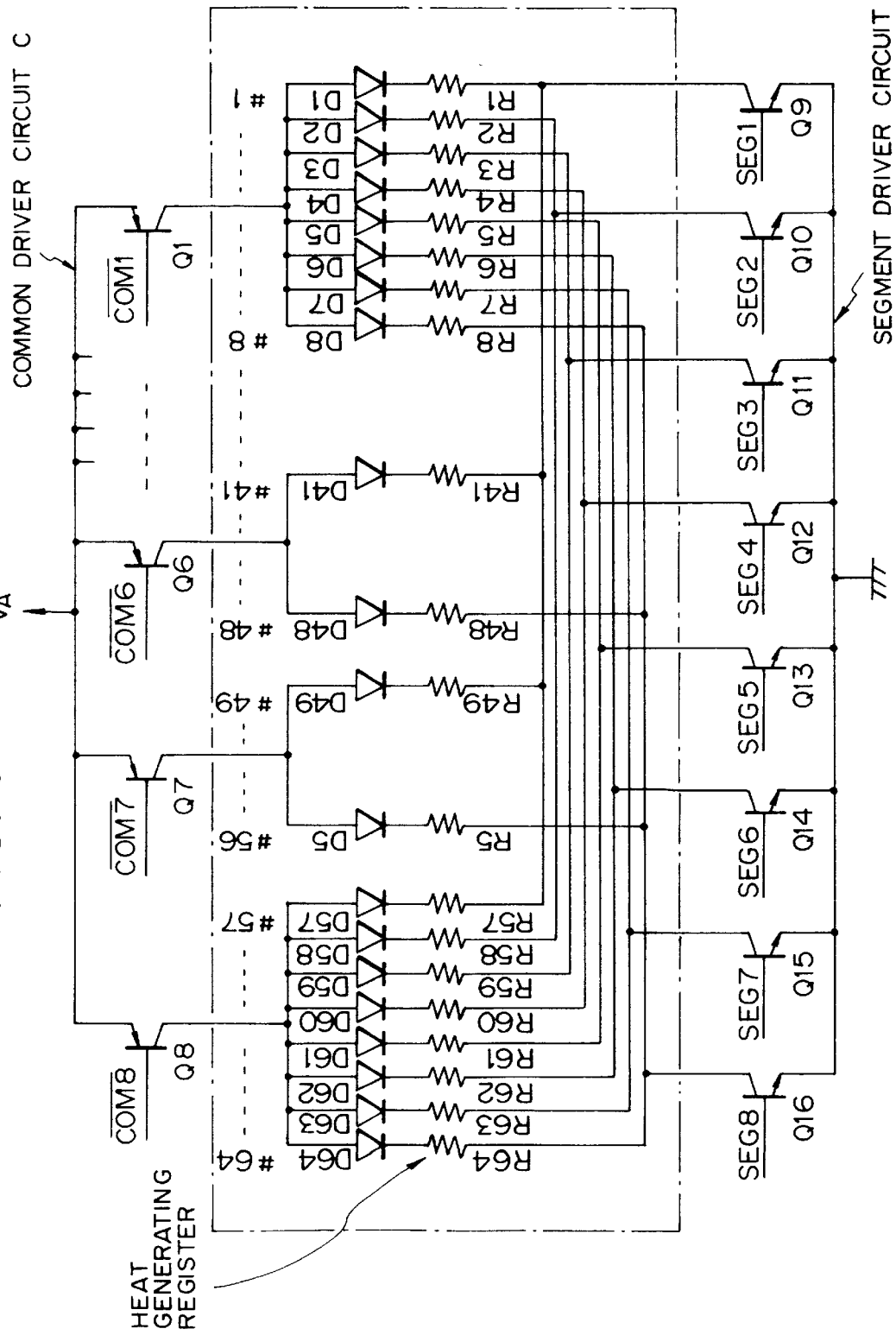
FIG. 5 illustrates the structure of a recording head and that of a head driver.

FIG. 5 illustrates the structure of the recording head and the head driver.

A discharge unit according to the present invention has 64 discharge ports given No. 1 to No. 64 which correspond to their positions in the discharge unit. Reference numerals R1 to R64 represent heat generating resistors serving as discharge energy generating elements disposed to correspond to the discharge ports No. 1 to No. 64. The heat generating resistors R1 to R64 are sectioned into blocks, each of which is composed of 8 heat generating resistors, the aforesaid blocks being commonly connected to corresponding switching transistors Q1 to Q8 of the common side driver circuit. The transistors Q1 to Q8 turn on/off the electricity passage in accordance with the state where control signal COM1 to COM8 are turned on/off. Backflow prevention diodes D1 to D64 are disposed in the electricity passages connected to the heat generating resistors R1 to R64.

Transistors Q9 to Q16 for turning on/off the segment driver circuit are connected to the heat generating resistors disposed at the similar positions in the blocks. The transistors Q1 to Q16 turn on/off the electricity passage connected to the heat generating resistors in accordance with turning on/off of control signals SEG1 to SEG8.

Figure 6:
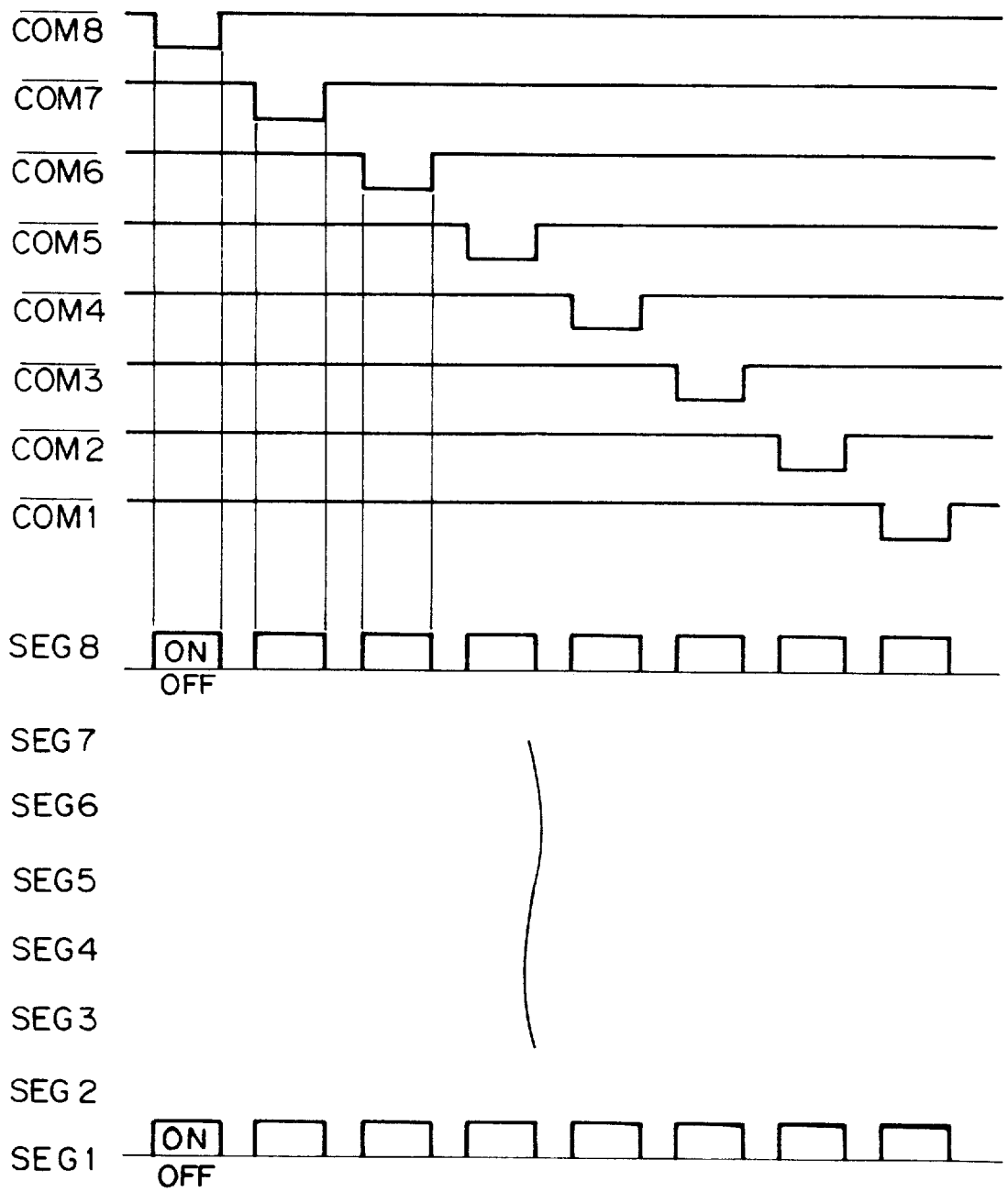
FIG. 6 is a timing chart for driving the head.

FIG. 6 is a timing chart for driving the head of the structure arranged as described above. The common side control signals COM8 to COM1 are sequentially turned on at a certain position in the head scanning direction. When any one of the common side control signals COM8 to COM1 is turned on, one of the blocks is selected and a state where electricity can be supplied is realized. Then, the segment control signals SEG8 to SEG1 are respectively turned on or off in accordance with an image to be recorded in the selected block, so that electricity is selectively supplied to the heat generating resistors and therefore ink is discharged due to generated heat. As a result, ink dot recording can be performed.

Figure 7:
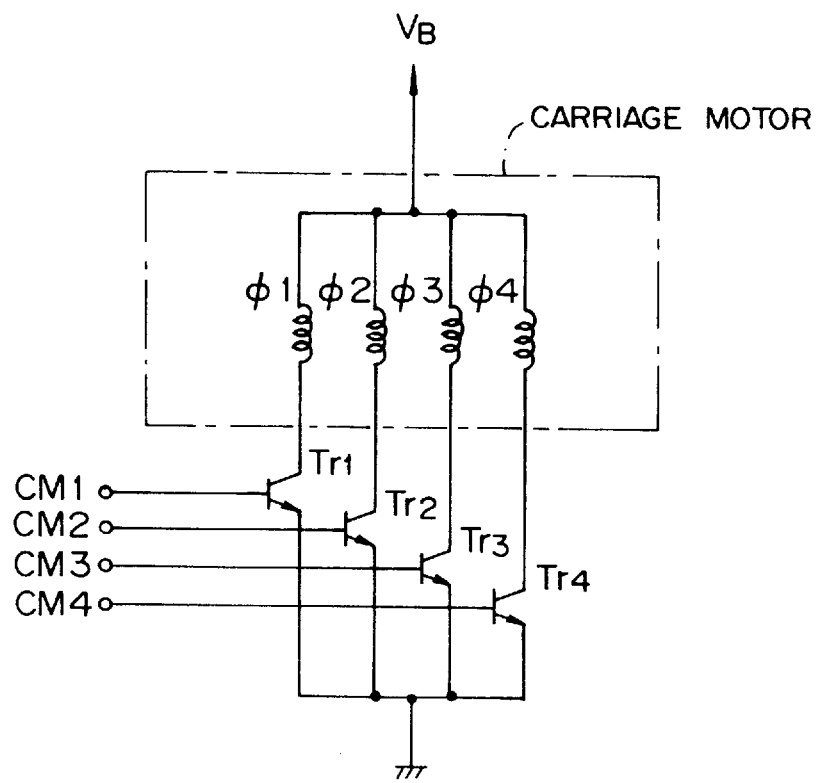
FIG. 7 illustrates the structure of a carriage motor and a motor driver.

FIG. 7 is a structural view which illustrates the carriage motor and the motor driver.

Figure 8:
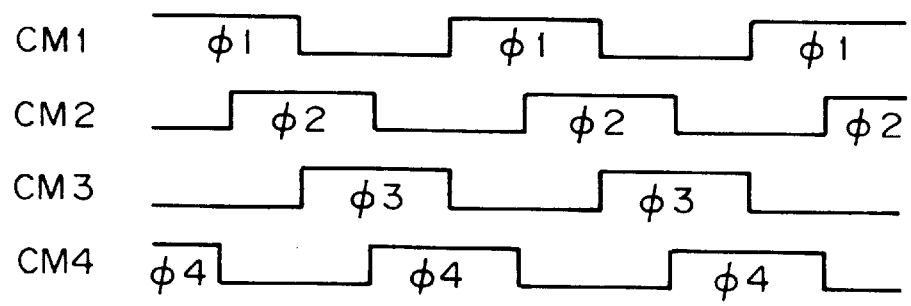
FIG. 8 is a timing chart for operating the driver shown in FIG. 7.

FIG. 8 illustrates the drive timing of the carriage motor and the motor driver.

Referring to FIGS. 7 and 8, a stepping motor having coils $\phi 1$ to $\phi 4$ is used to serve as the carriage motor which is driven in a two-phase exciting system as shown in FIG. 8 when switching transistors TR1 to TR4 connected to the coils $\phi 1$ to $\phi 4$ are appropriately turned on/off in response to drive signals CM1 to CM4.

Also the feed motor is similarly structured and is driven in response to drive signals FM1 to FM4.

[Structure of Printer Controller]

Figure 9:
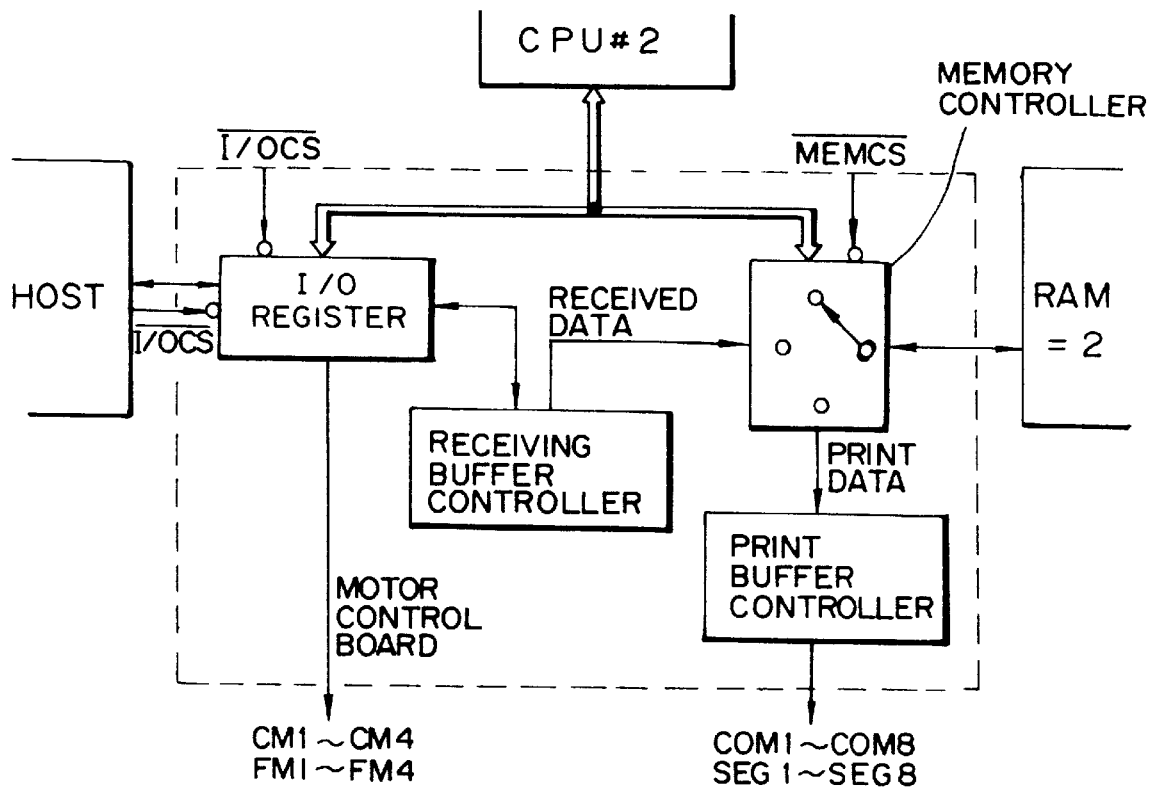
FIG. 9 illustrates the structure of a printer controller.

FIG. 9 is a structural view which illustrates the printer controller shown in FIG. 4.

The controller is composed of four function blocks, that is, an I/O data register for transmitting/receiving data to and from the host at a command level, a receipt buffer controller for directly writing received data supplied from the I/O data register to the No. 2 RAM, a print buffer controller for reading data recorded in the recording data buffer of the No. 2 RAM so as to transmit control signals COM1 to COM8/ SEG1 to SEG8 to the head driver, and a memory controller for controlling the three directional (that is, the No. 2 CPU, the receipt buffer controller, and the print buffer controller) memory access to the No. 2 RAM.

Figure 10:
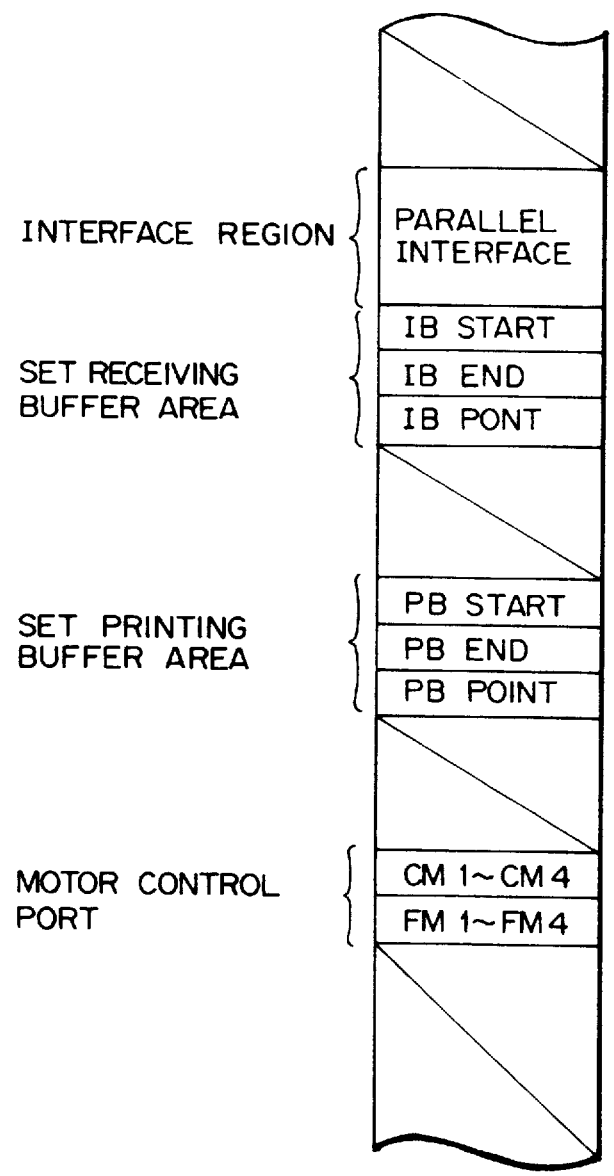
FIG. 10 illustrates the map of the printer I/O register.

FIG. 10 illustrates a map of the I/O data register (shown in FIG. 9) of the printer.

Motor control ports (CM1 to CM4 and FM1 to FM4) act to drive the motors by directly rewriting the value of the register.

Print buffer areas are so used to set data regions required to perform the printing operation that a start address (PB START) and an end address (PB END) are set so as to sequentially read print data starting from the start address to the end address of the No. 2 RAM by the print buffer controller in the aforesaid set range. Then, a control signal is transmitted to the head driver. At this time, a print data address pointer (PB POINT) indicates the data address from which data is being transmitted.

Also receiving buffer areas are so used to set the data regions required to receive data that a start address (IB START) and an end address (IB END) are set so as to sequentially write receipt data starting from the start address to the end address of the No. 2 RAM by the receiving buffer controller in the aforesaid set range. At this time, a receiving data address pointer (IB POINT) indicates the data address which has received data.

Figure 11:
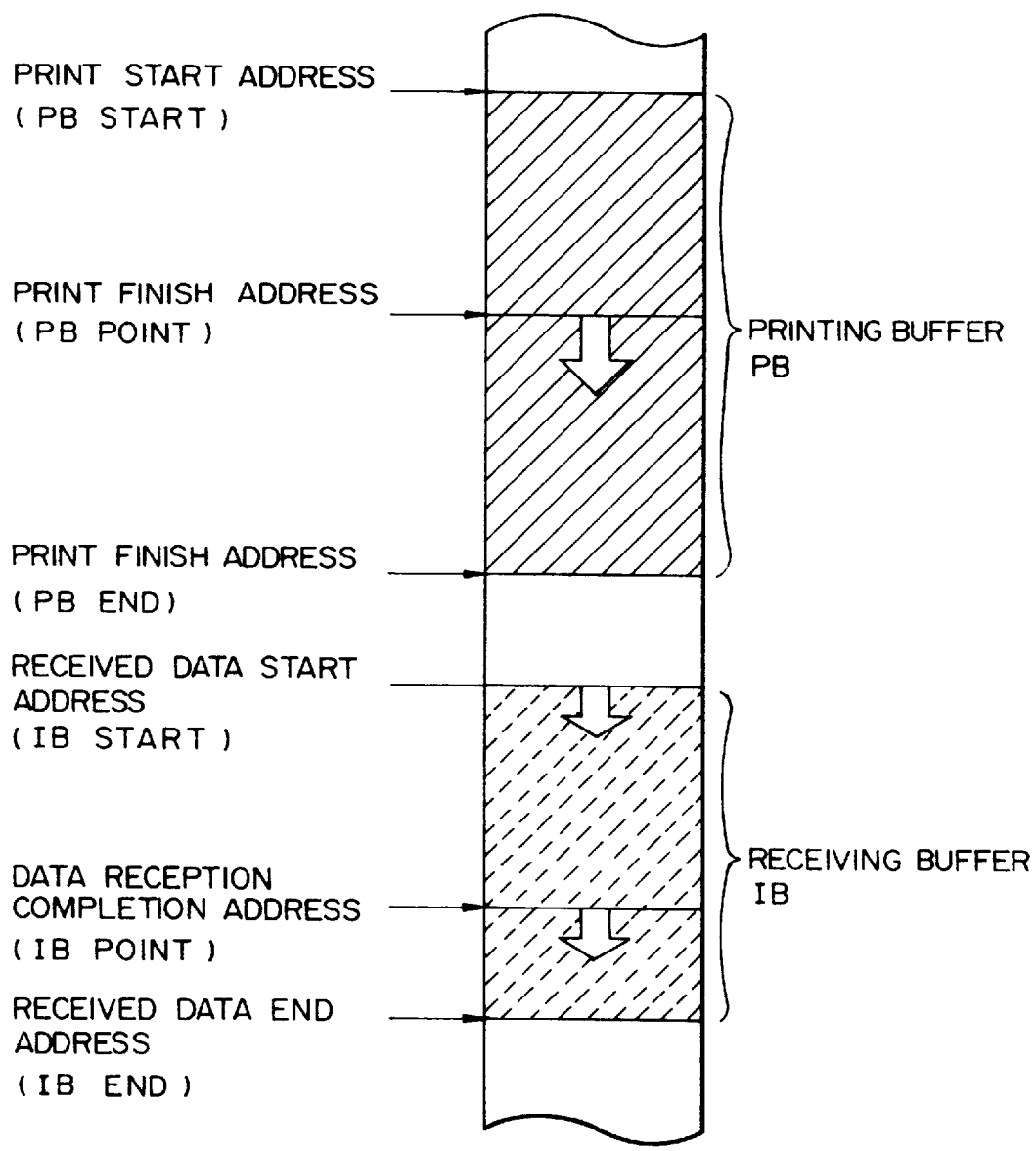
FIG. 11 illustrates the address region of the recording data buffer and that of the receiving buffer.

FIG. 11 illustrate the address regions of the print buffer (PB) and the receiving buffer (IB) on the No. 2 RAM which acts in the aforesaid operation. Each address is instructed by the printer I/O register as shown in FIG. 10. The interface region is a common I/O region between the host computer and the printer. The interface region is used to transmit/receive data to and from the host computer, the interface region corresponding to a port of a parallel interface for the host computer.

The interface region will now be described with reference to FIG. 12 which illustrates the correlated relationship realized in the inter face region between the host computer and the printer.

The address map is arranged in such a manner that the addresses (n, n+1, n+2) when viewed from the host side correspond to the addresses (m, m+1, m+2) when viewed from the printer so as to make the I/F data, the I/F status, and the I/F control registers of the host interface region indicate the same address as those of the I/F data, the I/F status and the I/F control registers of the printer interface region.

That is, the addresses in the aforesaid portion form a register to and from which data can be write/read in two directions.

Also the host computer has an I/O register for controlling peripheral equipment so as to control the I/O in the host computer. That is, the host computer has the I/O regions the blocks shown in FIG. 2 and only the control regions of the interface are arranged commonly to the interface region of the printer side I/O register. FIG. 12 illustrates the aforesaid relationship. The host side and the printer side are connected to each other by a general-purpose parallel interface.

Printer selects (the host side address n+3 and the printer side address m+3) are I/O registers for turning on/off the printer from the host. That is, if 0 is written to the printer selected on the host side, the printer is turned off (non-selected), while the printer is turned on (selected) if 1 is written to the same. The operation of writing data to the I/O register may be performed by exclusive application software, or a key of the keyboard may be set to switch on/off the printer whereby writing is performed whereby the key is depressed. As an alternative to this, the printer select may be switched off by instructing the document edition.

An embodiment of the present invention for controlling the initialization of the printer by using the print select register will now be described.

Figure 13:
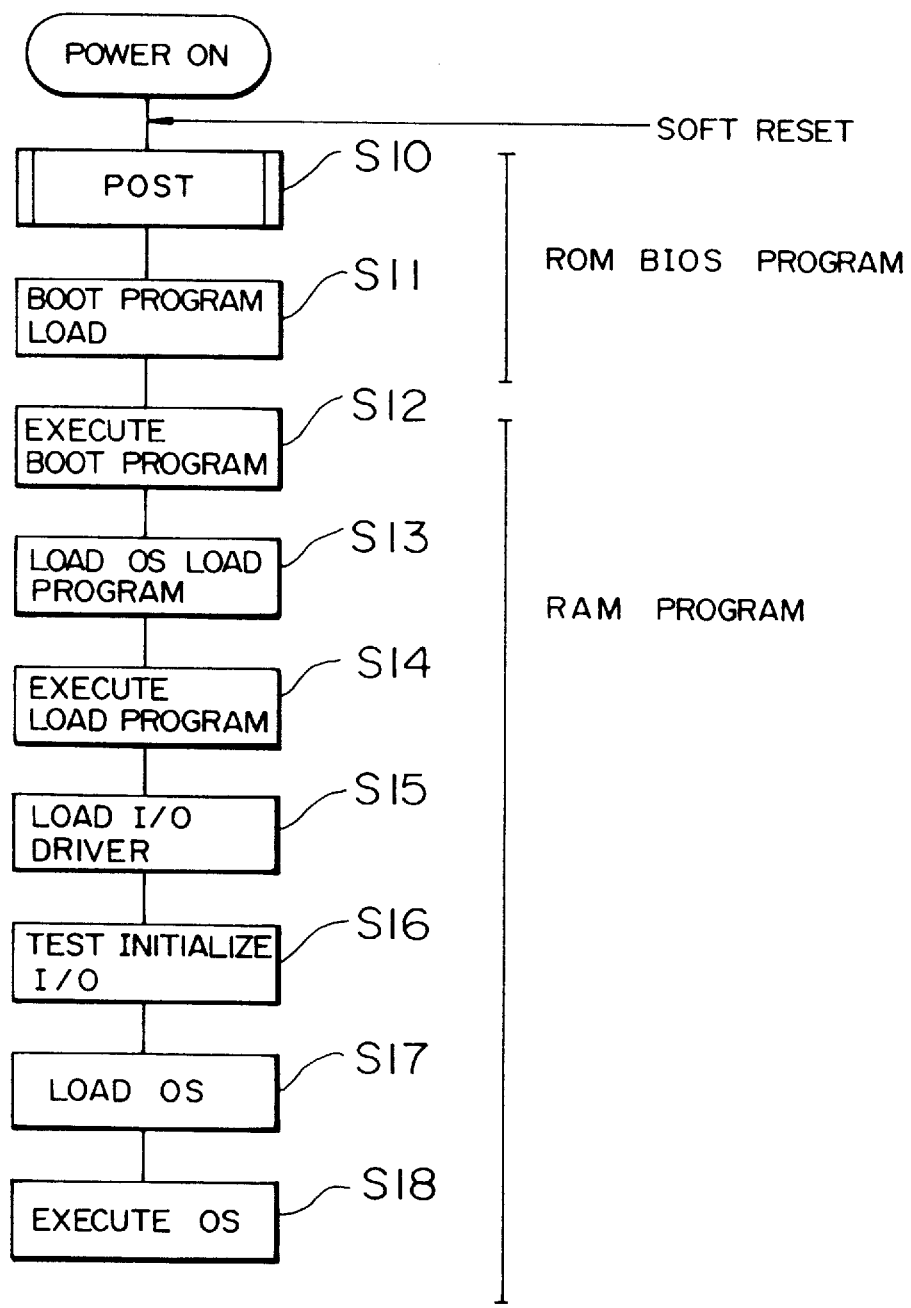
FIG. 13 is a flow chart of the operation to be performed when power is supplied.

Referring to a flow chart shown in FIG. 13 adapted to a state where the power is supplied, the flow first proceeds to step S10. A software reset process by using the keyboard also proceeds to step S10 similarly to the power supply state. In step S10, the POST process is performed in such a manner that each hardware is tested in a "power on self-test" method and as well as it is initialized. Then, the flow proceeds to step S11 in which a boot program is loaded so as to start the system program. The boot program is stored by a FD (floppy disk) or a HD (hard disk) at (track 0, sector 1) for example. By reading the (track 0, sector 1) into the memory, the boot program is loaded. The processes S10 and S11 are present in the ROM BIOS. Then, the flow proceeds to step S12 in which the loaded boot program is executed. The boot program is a program for loading a program for loading an OS program from the FD or HD. Then, the flow proceeds to step S13 in which the OS program is loaded. Then, the flow proceeds to step S14 in which the OS load program is executed. The OS load program is a program for loading the OS into the memory, with which an I/O driver is first loaded in step S15. The I/O driver is a driver for controlling the I/O, the I/O driver enables the OS to transmit/receive data to various I/Os. Then, the flow proceeds to step S16 in which the I/O is tested and the initialization is performed. Then, the flow proceeds to step S17 in which the OS is loaded into the memory. Thus, the preparation for executing the OS is completed, and the flow proceeds to step S18 in which the OS is executed. The OS processes an input made by the keyboard, indicates various messages on a display and performs communication with an operator. The OS executes various command processes in accordance with a variety of commands supplied by the operator.

Figure 14:
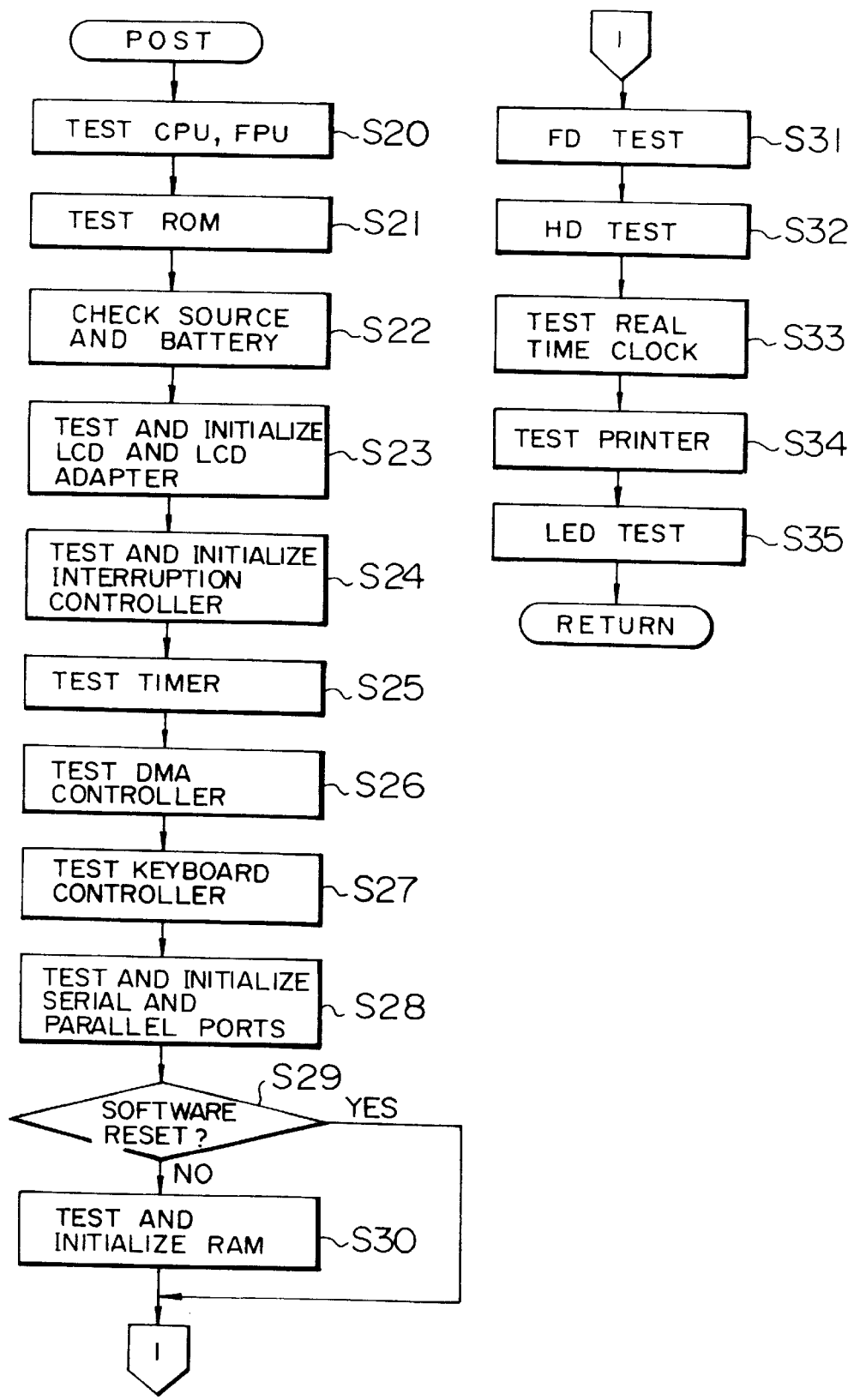
FIG. 14 is a flow chart of a POST operation.

FIG. 14 is a flow chart which illustrates the POST in step S10 shown in FIG. 13, in which the CPU (the FPU shown in FIG. 2 (the numerical operation processor, coprocessor) is tested (step S20), and then the ROM is tested (step S21). Then, the power source and the battery are checked (step S22). Then, an LCD and an LCD adapter are tested and initialized, the LCD adapter including a RAM and a ROM which are also checked (step S23). Then, the interruption controller is tested and initialized (step S24), the timer is tested (step S25), and a DMA controller is tested (step S26). Then, the keyboard and the keyboard controller are tested (step S27), and a serial/parallel port is tested and initialized (step S28). Then, whether or not the software has been reset is tested (S29). If the software has been reset, the test of the RAM and the initialization in step S30 are skipped and the flow proceeds to step S31. If the software has not been reset, the flow proceeds to step S30 in which the RAM is tested and the initialization is performed. Then, the FD (floppy disk) is tested (step S31), and the HD (hard disk) is tested (step S32). Then, a real time clock is tested (step S33), and the printer is tested (step S34). The printer is tested in such a manner that the various printer ports are checked and the connection of the printer is checked. Then, the LED is tested (step S35), and the flow returns. As a result of the aforesaid processes, the POST process in step S10 shown in FIG. 13 is performed and if an error takes place in each device, the occurrence of the error is notified.

Then, the keyboard interruption process and the key code acquisition process will now be described. The keyboard interruption process is performed in such a manner that an interruption is generated from the keyboard controller and it is processed by an interruption controller. The key code acquisition process is so performed that the key code stored due to the keyboard interruption is taken from the key buffer and the key code is returned to the required process. The key buffer (omitted from illustration) is disposed in the BIOS common area on the RAM shown in FIG. 2. The keyboard interruption process is assigned to, for example, the entry of the hardware on the interruption map (omitted from illustration) of each I/O, while the key code acquisition process is assigned to, for example, the entry of the software interruption. Each of the processes is executed by the interruption made by using the keyboard or call of the software interruption.

Figure 15:
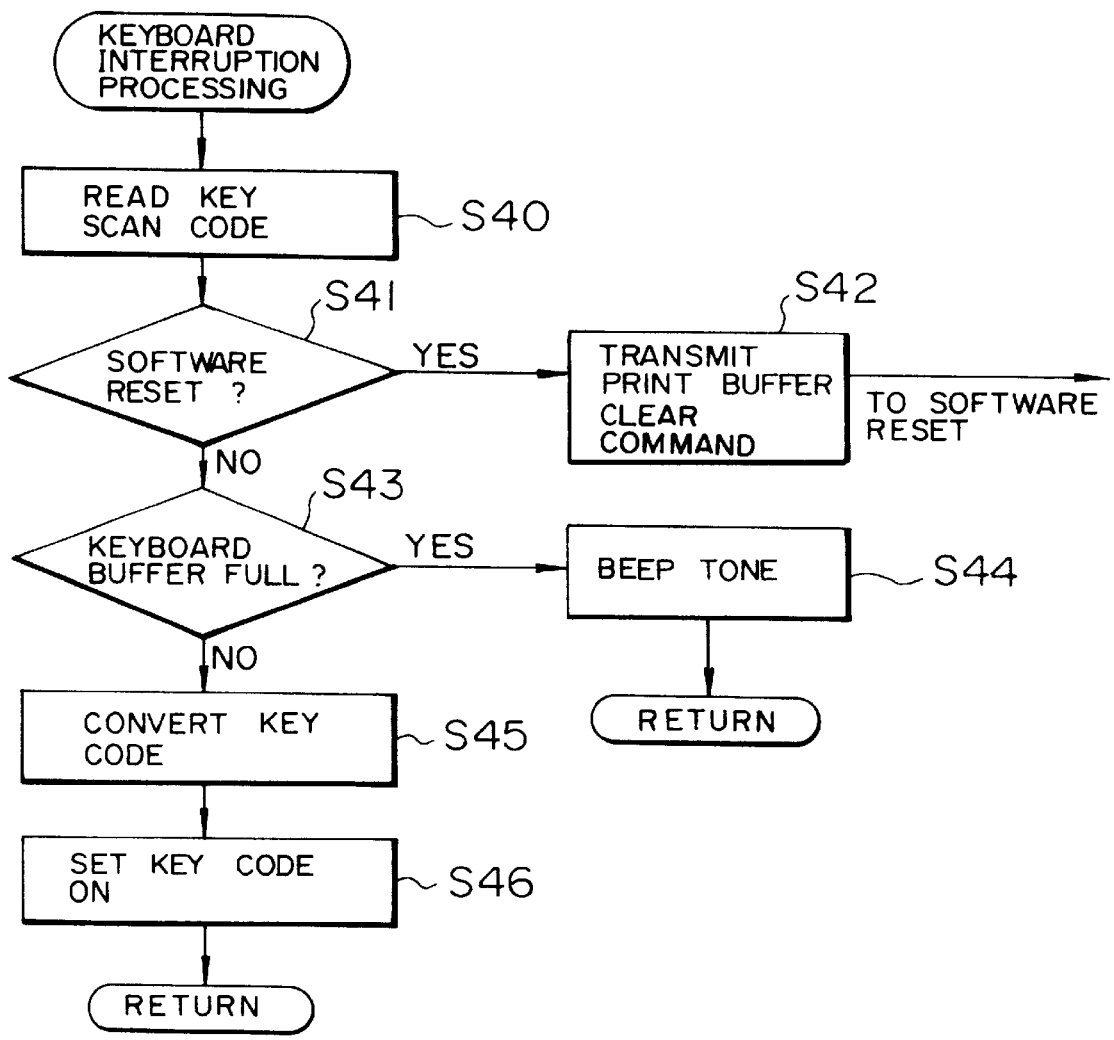
FIG. 15 is a flow chart of a keyboard interruption process.

FIG. 15 is a flow chart of a process to be performed when the keyboard interruption is generated. Referring to FIG. 15, when the keyboard interruption is generated, the key scan code is read from a port of the I/O assigned to the key board in step S40. The read code is subjected to a discrimination to be made in step S41 as to whether or not it is a code corresponding to the software reset. If an affirmative discrimination is made, the flow proceeds to step S42 in which the transmission of a print buffer clear command is executed, and the actual software resetting operation is commenced after the execution. If the code, which has been read, is not the software reset, whether or not the keyboard buffer is filled with data is confirmed in step S43. If it is filled with data, beep warning sound is generated in step S44 and the process is completed here. If it is not filled with data, the key scan code is converted into a key code which corresponds to the character code in step S45. Then, the converted key code is set to the key buffer in step S46 and the process is completed here.

As described above, the buffer clear command is transmitted to the printer at the time of executing the software resetting operation in the keyboard interruption process and thus the buffer of the printer is cleared.

Figure 16:
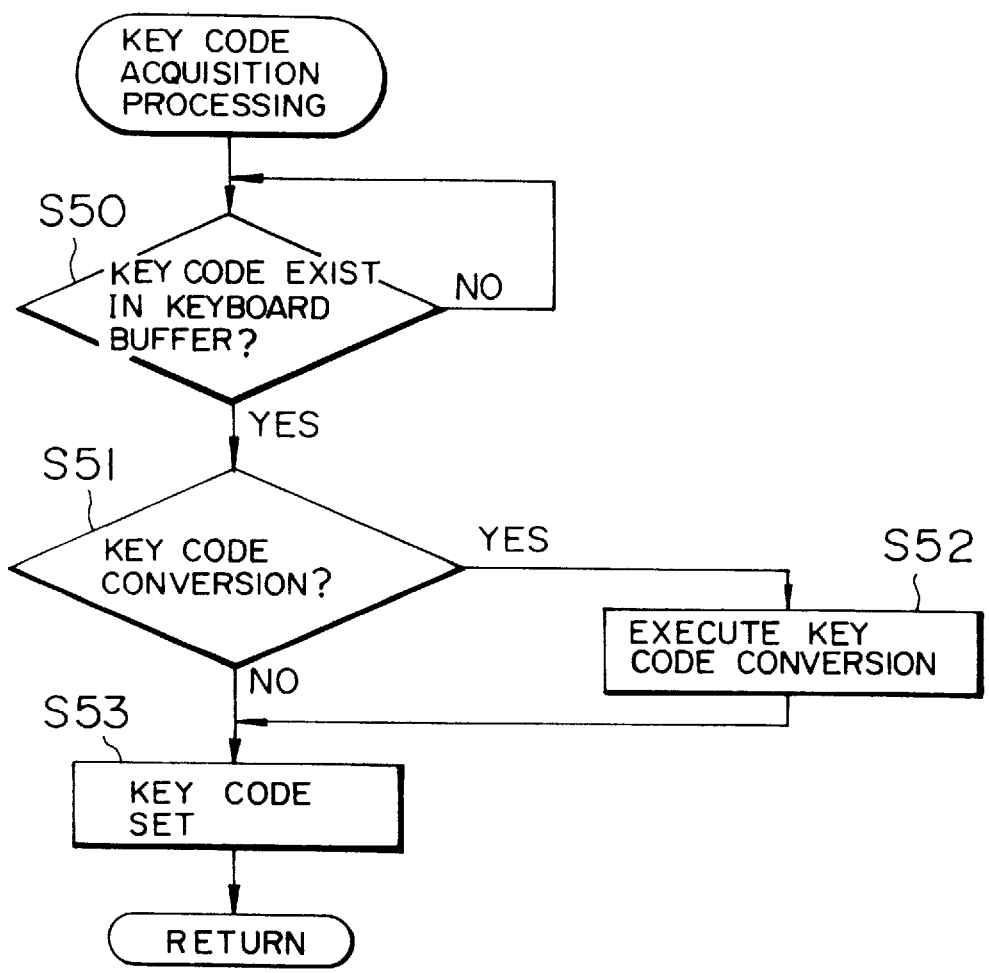
FIG. 16 is a flow chart of a key code acquisition process.

FIG. 16 is a flow chart which illustrates the key code acquisition process.

Referring to FIG. 16, when the key code acquisition operation is commenced, whether or not the key code is present in the keyboard buffer is discriminated in step S50. If the key code is not present, the operation in step S50 is repeated and the input of the key code into the keyboard buffer is waited for. If the key code is present, whether or not the key code must be converted is discriminated in step S51. If the aforesaid conversion must be performed, the key code is converted in step S52 (the conversion of the key code takes place, for example, in a case where the keyboard is different for each nation).

If it is not necessary for the key code to be converted, or after the conversion has been performed in step S52, the key code is set to a register for returning the key code in step S52 and thus the operation is completed here.

Figure 17:
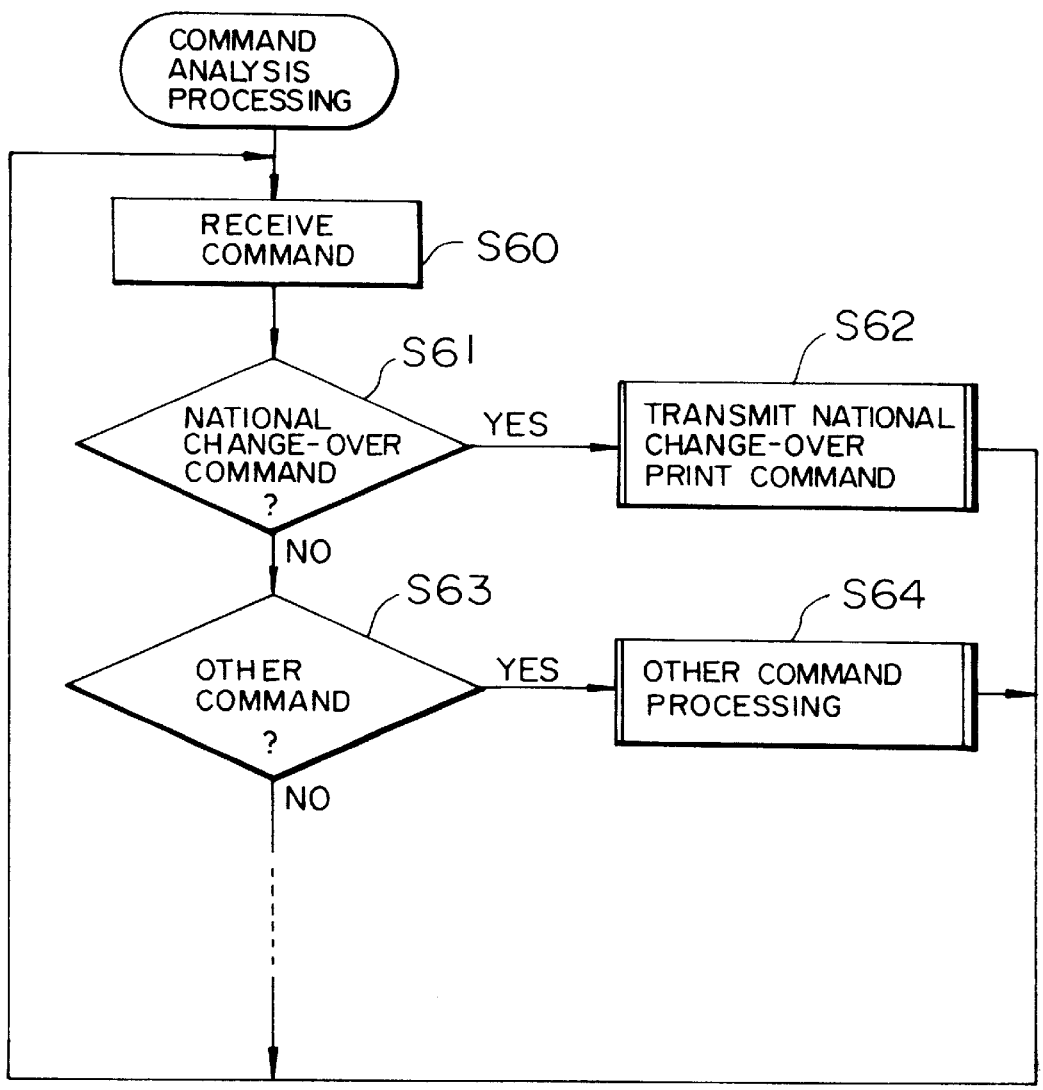
FIG. 17 is a flow chart of a command analysis process.

FIG. 17 is a flow chart which illustrate a command analysis process which is instructed from the host by using a key.

When the command analysis process is started, the input of a command made by an operator by using the keyboard is received in step S60. Then, whether or not the received command is a nation change-over command is discriminated in step S61. If an affirmative discrimination is made, the process of transmitting the nation change-over print command is executed in step S62 and the command input is again waited for.

If a negative discrimination is made, whether or not the supplied command is another command is discriminated in step S63. If an affirmative discrimination is made, a corresponding process is performed in step S64 and the input of the command is again waited for.

In steps S61 to S64, a required number of similar processes are expanded. However, their detailed descriptions are omitted here.

Figure 12:
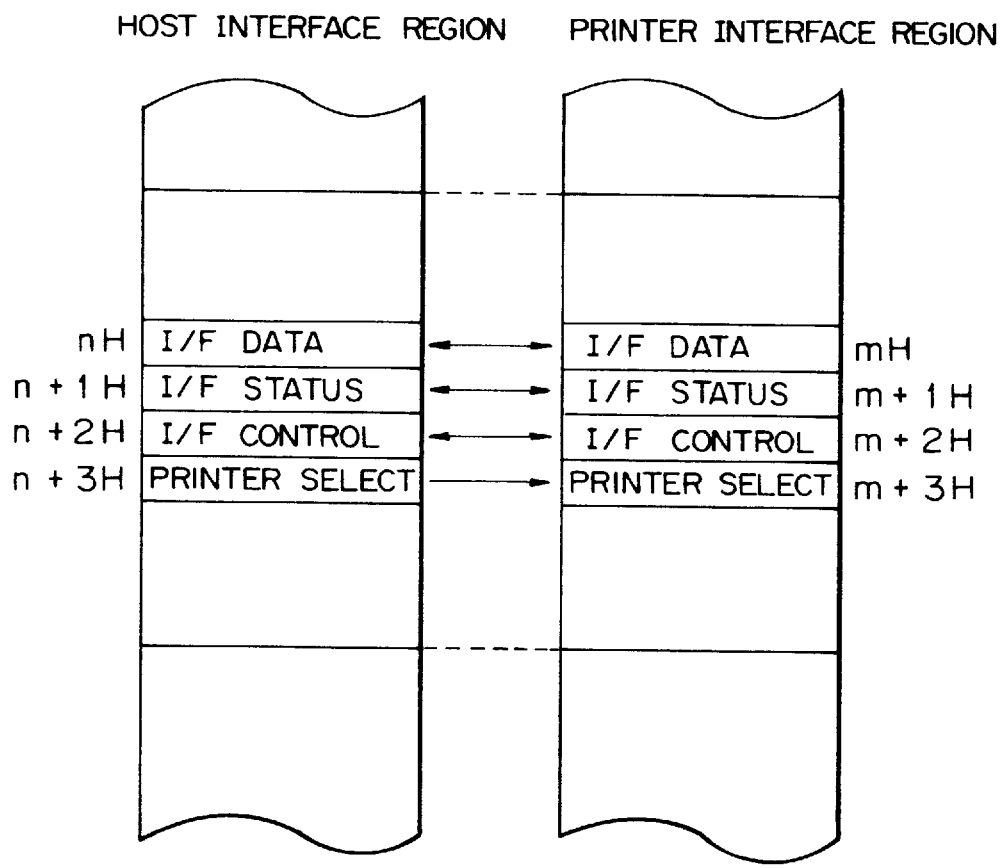
FIG. 12 illustrates the correlative relationship between the host computer and the printer realized in the I/O region.

Also the printer select shown in FIG. 12 can be changed by an input of a command made by the operator.

Then, a case where the nation change-over command is executed will now be described. The OS executes the following nation change-over process in accordance with a command to change over the nation made by the operator.

Figure 18:
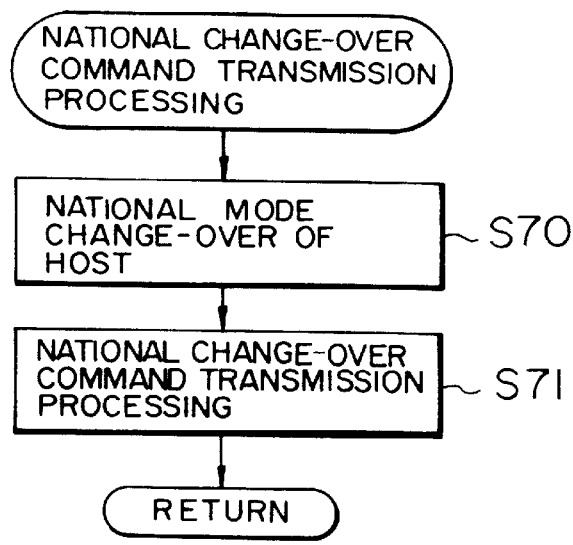
FIG. 18 is a flow chart of a host side nation change-over process.

FIG. 18 is a flow chart which illustrates the nation change-over print command transmission process to be performed on the host side in step S62 shown in FIG. 17.

When the nation change-over print command transmission process is started, the present national mode set on the host side is changed to a desired national mode in accordance with a command supplied by using a key in step S70. Information about the national mode is stored in the RAM shown in FIG. 2. When the aforesaid change has been completed, a nation change-over print command is transmitted to peripheral equipment in order to change over the nation. Thus, the aforesaid process is completed.

Figure 19:
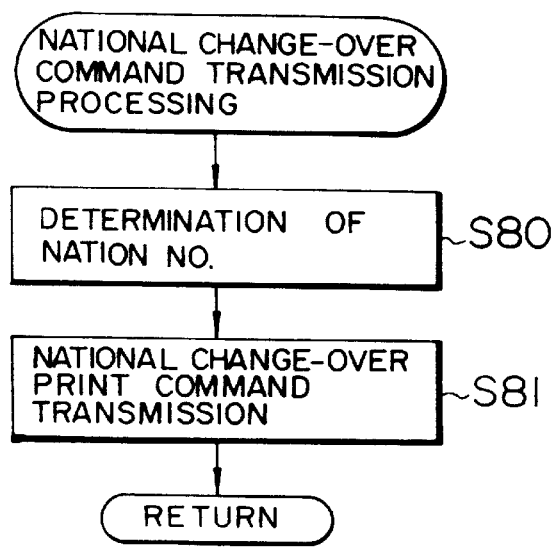
FIG. 19 is a flow chart of a printer side nation change-over process.

FIG. 19 is a flow chart which illustrates the nation change-over print command transmission process to be performed in step 81 shown in FIG. 18.

When the nation change-over print command transmission process is executed, information of the selected nation is examined among nation information stored in the body (host) side RAM in step S80 and No. of the corresponding nation is determined so as to be transmitted to the printer.

In order to change over the printer to correspond to the determined nation No., the nation change-over print command is transmitted and thus the subject process is completed in step S81.

Figure 20:
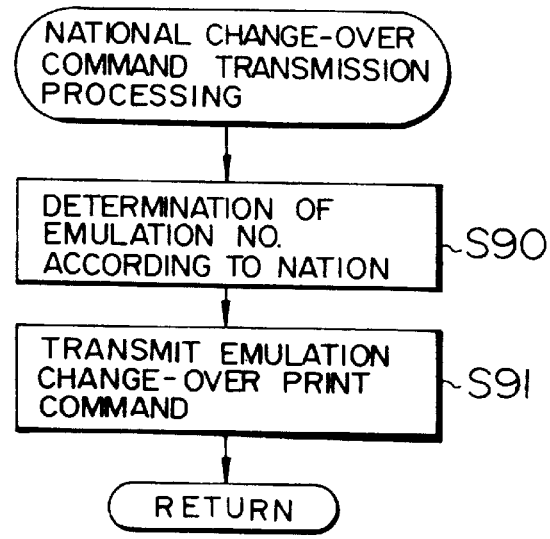
FIG. 20 is a flow chart of a printer side nation change-over process at the time of executing an emulation.

FIG. 20 is a flow chart which illustrates a nation change-over print command transmission process (emulation switch) according to another embodiment of the present invention.

When the nation change-over print command transmission process is started, information about the selected nation stored in the RAM shown in FIG. 2 of the body (host) is examined in step S90 and the emulation No. corresponding to the selected nation is determined, the emulation No. being stored in the RAM shown in FIG. 2 while being formed in a table to correspond to nations.

In order to change over the printer to adapt to the determined emulation, an emulation change-over print command is transmitted to the printer in step S91 and the subject process is completed here.

As a result, the nation change-over command is issued, so that the printer side nation, the printer side emulation can be changed over simultaneously with changing over the host side nation mode. The control of the printer will be described later with reference to FIG. 30.

Then, the operation to be performed in the printer will now be described. The printer is provided with three emulation processes, the program of each of which can be changed over to meet a desire.

Figure 21:
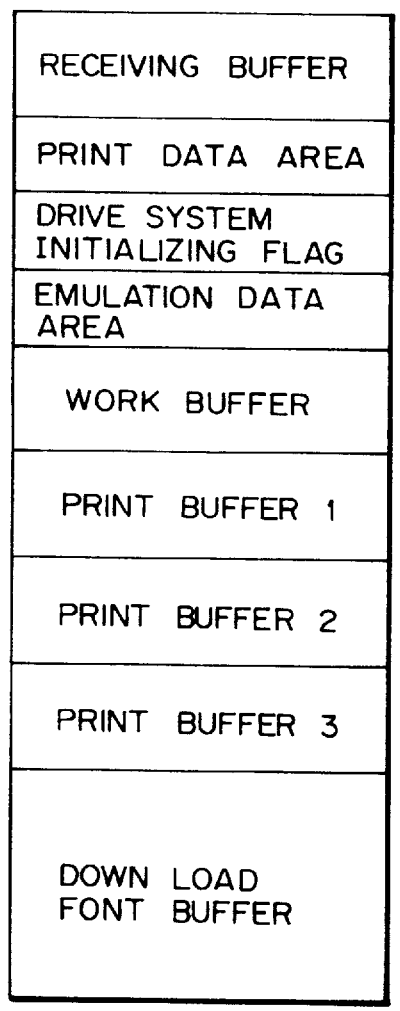
FIG. 21 illustrates the structure of a No. 2 RAM.
Figure 26:
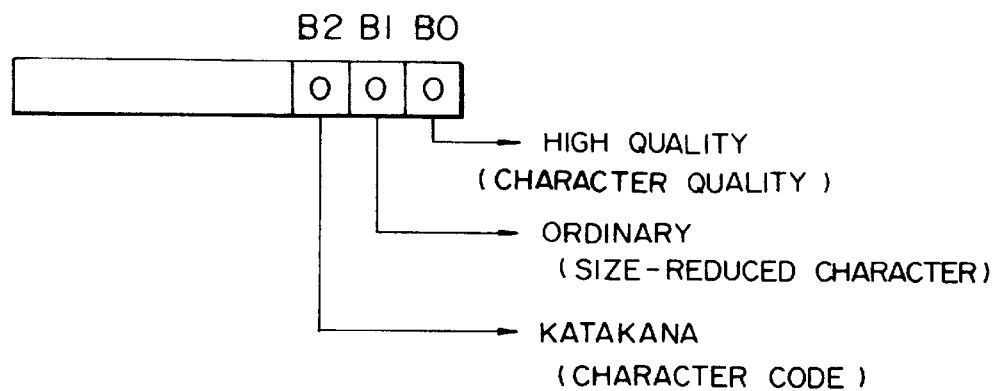
FIG. 26 illustrates the initial value of emulation information.

FIG. 21 illustrates a read/write memory of the No. 2 RAM shown in FIG. 4, the read/write memory including buffers, and flags, and the like. Referring to FIG. 21, a receiving buffer is a buffer for receiving a print command and print data transferred from the body to the printer, the receiving buffer storing data inputted to the input port of the printer. A drive system initializing flag is a flag denoting whether or not the print drive system such as the carriage has been initialized (which can be considered to be equivalent to data to be described later and denoting whether or not the printer has not been selected). A print data area is a data area including flags and registers required to perform the printing operation. The printing operation is performed by using a value stored in the aforesaid area, for example, margin information. An emulation data area is a data area including flags, registers and emulation information required to perform the emulation process. The emulation operation is performed by using a value stored in the aforesaid area. The contents of the emulation data area are shown in FIG. 26 in detail. A work buffer is a work area which is temporarily used in the printing operation and the emulation operation to perform works such as processing and/or changing data. Print buffers 1 to 3 are areas for storing data to be used in the printing operation. In the print buffers 1 to 3, print image data processed by the emulation process is stored, data stored in the print buffers 1 to 3 being transferred to a printing portion. As a result, the printing operation is performed. Each of the print buffers 1 to 3 is able to store data for a required size for each printing operation. According to this embodiment, the three print buffers 1 to 3 are provided. The reason why a plurality of the print buffers are provided lies in that this arrangement enables another print image to be developed during a period in which a certain print buffer is being used in the printing operation. As a result, the data development and the printing operation can be performed in parallel. A download font buffer is an area for storing font data transferred from the body in a case where font except for font data stored in the printer is printed. If the font is transferred to the aforesaid download font, the printing operation is performed by using the font stored in the aforesaid area.

Figure 22:
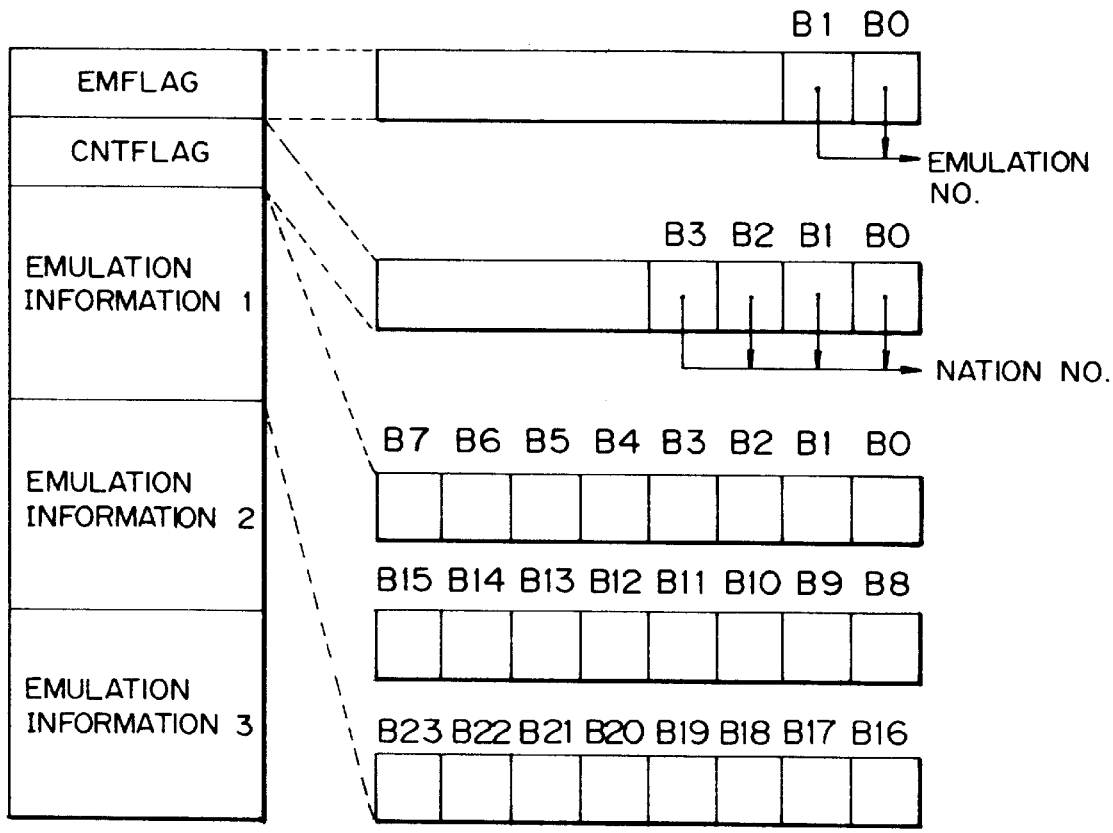
FIG. 22 illustrates the detailed structure of an emulation data area.

FIG. 22 illustrates the detailed arrangement of the emulation data area. Referring to FIG. 22, emulation flag EMFLAG stores the emulation No. and denotes the corresponding emulation No. by using two bits B0 and B1. Each of the bits B0 and B1 is able to possess values from 0 to 3. The value 0 denotes emulation 2, 1 denotes emulation 2, and 2 denotes emulation 3. According to this embodiment, the aforesaid values correspond to the emulations 1 to 3 each of which corresponds to a value registered in the aforesaid emulation flag EMFLAG. Emulation Nos. instructed at the time of executing the emulation change-over print command are set to EMFLAG. Nation flag CNTFLAG is a buffer for storing the nation No. in such a manner that the No. of the nation is stored in the form of 4 bits from B0 to B3. Since the four bits from B0 to B3 are able to express values from 0 to 15, the nation Nos. can be expressed with the aforesaid values. This embodiment is adapted to Japan and U.S.A. in such a manner that value 0 denotes U.S.A. and value 1 denotes Japan. Also other nations are able to possess individual values. In accordance with the nation change-over print command, the nation No. is set to the nation flag. Emulation information 1 to 3 are areas for storing emulation information stored by the corresponding emulation, the area being expressed by 24 bits from B0 to B23. Each of bits from B0 to B23 is used to instruct information required in each emulation, for example, the quality of the character or the length of the page. The areas further store values to be used as the initial values in the emulation operations. The aforesaid information can be set/changed by an information setting or changing command so that information is rewritten to correspond to the emulation which is being performed. Although description of the contents of each bit is omitted here, the bits are able to possess required emulation information according to this embodiment. Although the emulation information 1 to 3 are formed similarly to one another, the contents of the bits can be specified by each emulation.

Figure 23:
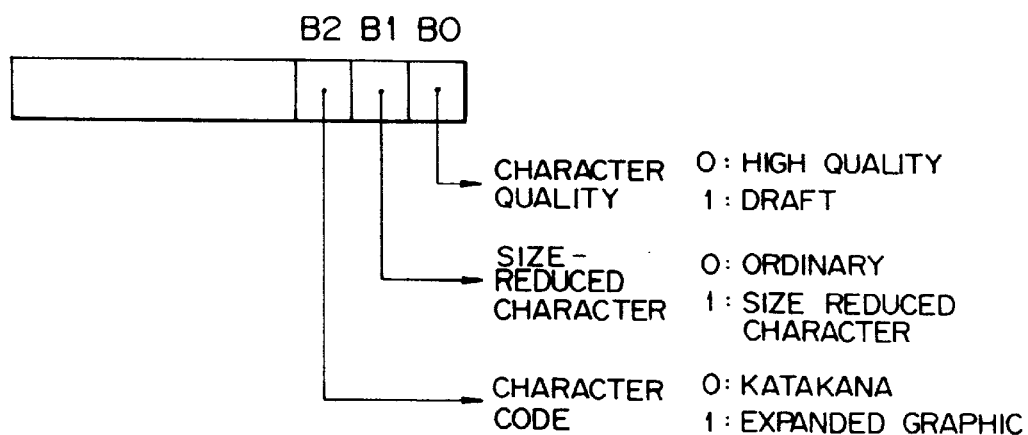
FIG. 23 illustrates a specific example of emulation information.

FIG. 23 illustrates a specific example of the emulation information. According to this example, each bit has a character grade, a size reduced character and a character code functions in such a manner that each bit shows the selected function in the emulation operation by 0 and 1. The emulations can be formed similarly to one another, or may be formed individually. Furthermore, the classification can be so made that a plurality of bits are used to possess a variety of values.

As described above, each emulation is performed in accordance with the value stored in the emulation data area.

Figure 24:
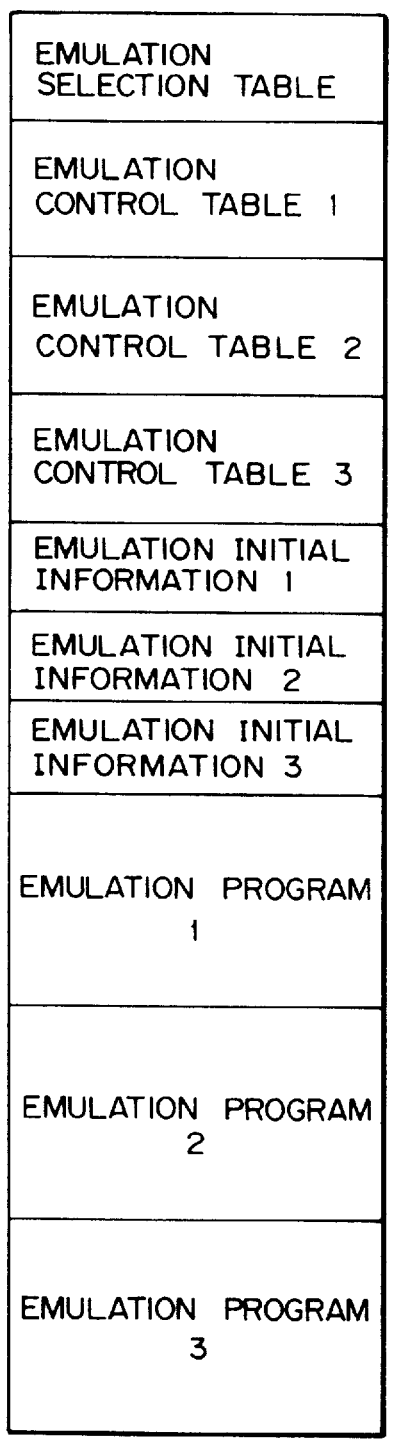
FIG. 24 illustrates a table at the time of executing the emulation.

FIG. 24 illustrates a table for use to execute the emulation and is stored in the No. 2 ROM (in the printer) shown in FIG. 4. The emulation selection table includes a pointer for indicating each of emulation control tables 1 to 3. The emulation control tables 1 to 3 are control tables for the corresponding emulations 1 to 3. Emulation initial information 1 to 3 are tables for holding the initial values of information about corresponding emulations. The aforesaid initial values are used as the initial values for use in a case where the command is instructed or a case where information is not set, the values being set to emulation information areas 1 to 3 shown in FIG. 22. Emulation programs 1 to 3 store programs for the corresponding emulations so that any one of the emulation programs 1 to 3 is executed.

Figure 25:
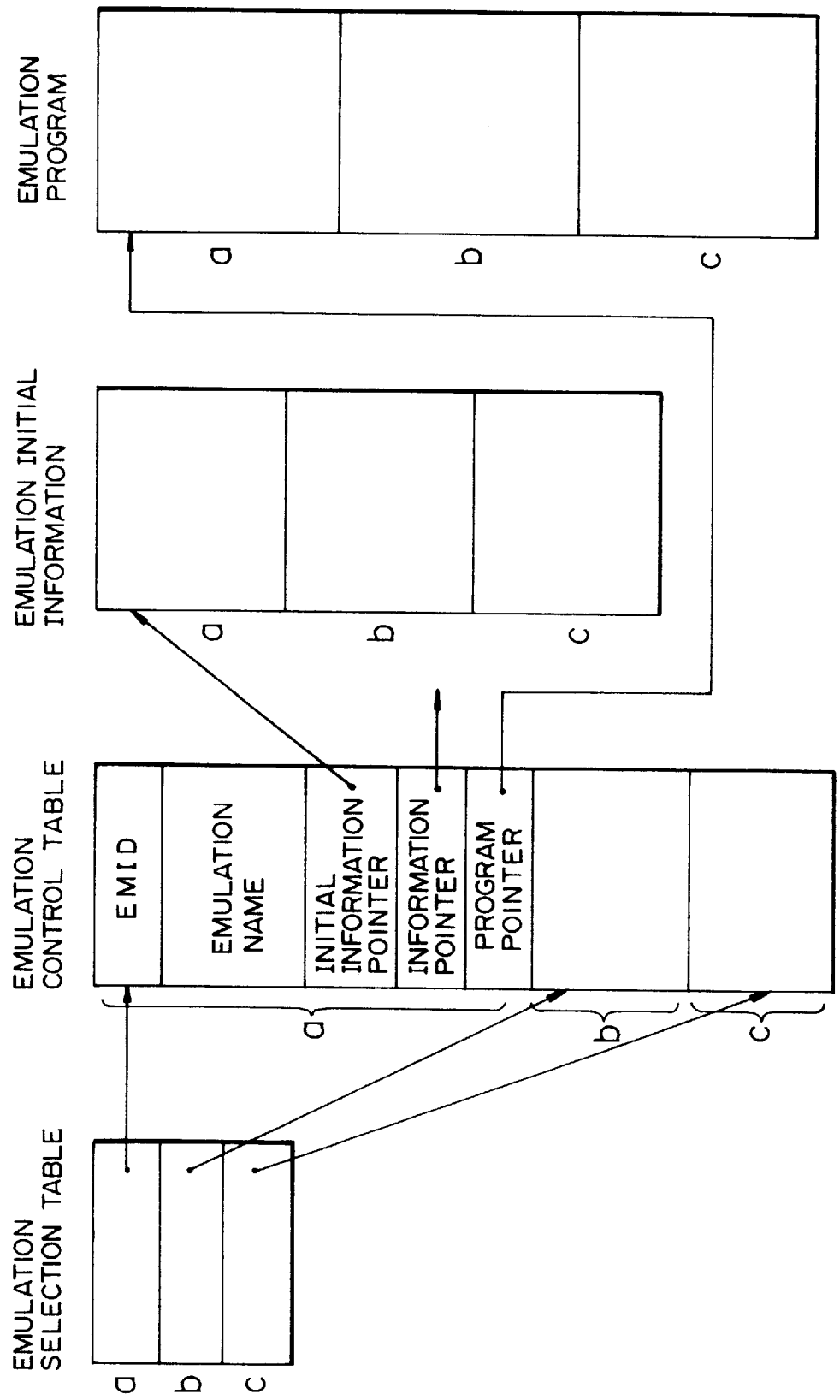
FIG. 25 illustrate the structure of the table shown in FIG. 24.

FIG. 25 illustrates the structures of tables shown in FIG. 24, where → shows pointers which hold the addresses of the tables. An emulation selection table has pointers pointing emulation control tables a to c. The emulation control table has emulation ID, that is EMID which is an indicator of the emulation which corresponds to each emulation, the indicators having individual values with respect to the emulations. An emulation name is a character row showing the name of the emulation, the emulation name being used when there is a desire to know the name of the emulation. An initial information pointer is a pointer which indicates the table which includes the initial value of the emulation initial information. Each emulation indicates the table of each initial information. An information pointer is a pointer which indicates each emulation information (FIG. 22), the information pointer indicating the table of the present emulation information. In accordance with data indicated by the pointer, the emulation is executed. A program pointer is a pointer which indicates the emulation program, the program pointer indicating the program executed in each emulation. By using the aforesaid pointer, the address of each program is used at the time of changing over each emulation.

FIG. 26 illustrates the initial values set in the emulation initial information shown in FIG. 25 in the No. 2 ROM shown in FIG. 4. FIG. 26 corresponds to the emulation information shown in FIG. 23 and illustrates the initial values in this embodiment. In the case of this emulation, the setting of the high quality, ordinary, and katakana are the initial values. The contents of the aforesaid table becomes the initial value of the emulation information.

By using the emulation execution table, the emulation is changed over and controlled actually.

Figure 27:
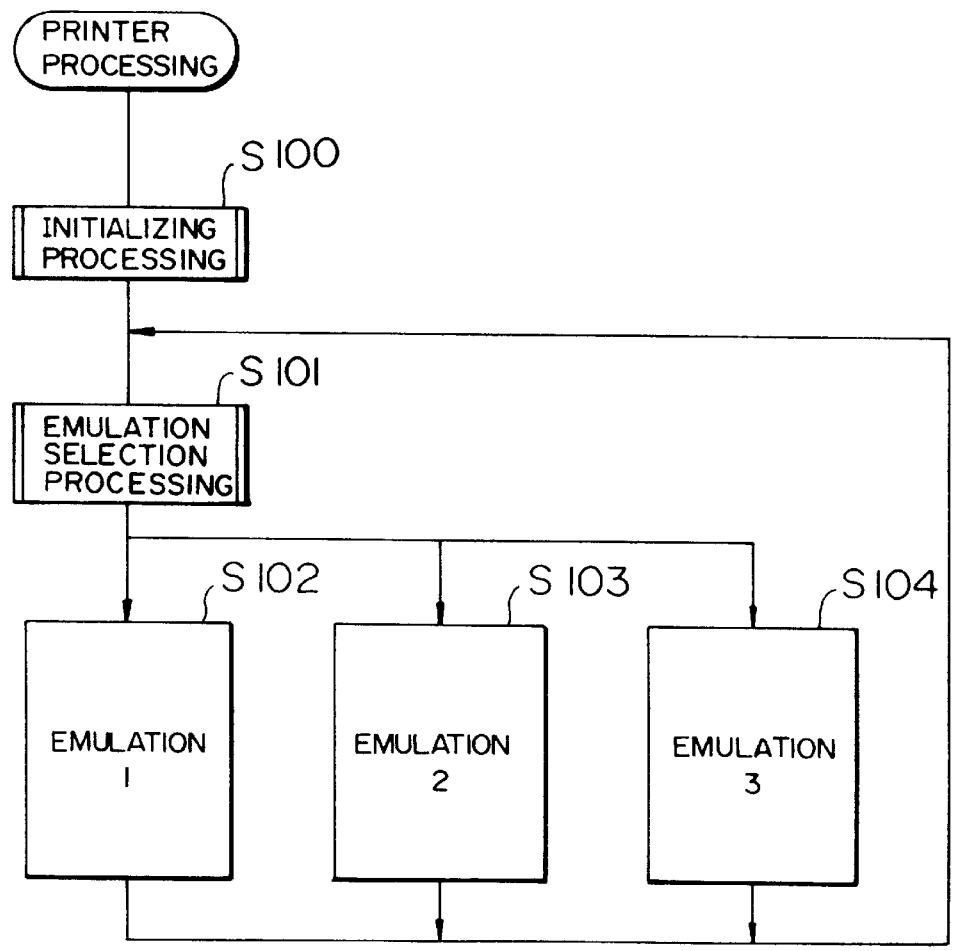
FIG. 27 is a flow chart for controlling the printer according to the embodiment of the present invention.
Figure 29:
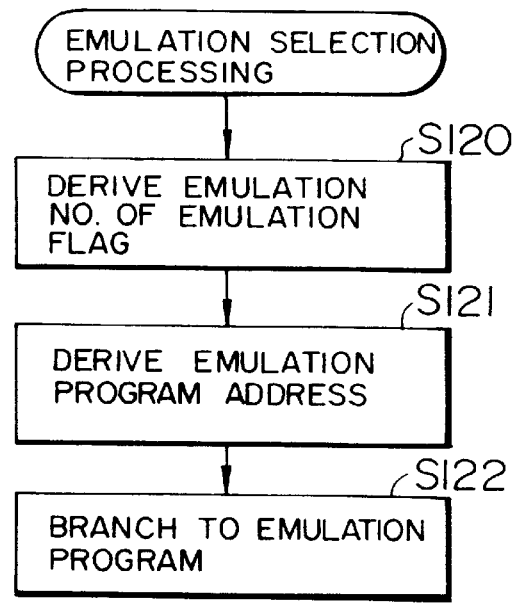
FIG. 29 is a detailed flow chart of step S101 shown in FIG. 27.

FIG. 27 is a flow chart which illustrates the process to be performed by the printer according to this embodiment. The initialization is performed in such a manner that the print buffer is cleared for example. Then, the flow proceeds to step S101 in which the emulation selection process is performed. The selection process is shown in FIG. 29 in detail. As a result of the selection process in step S101, any one of the emulations 1 to 3 is selected and executed. Any one of the three emulations in steps S102 to S104 is performed, and each emulation acts to complete the sequential operation. Therefore, when the emulation change-over command is executed, each emulation is completed and the flow proceeds to the emulation selection process in step S101. The aforesaid process is repeatedly executed.

Figure 28:
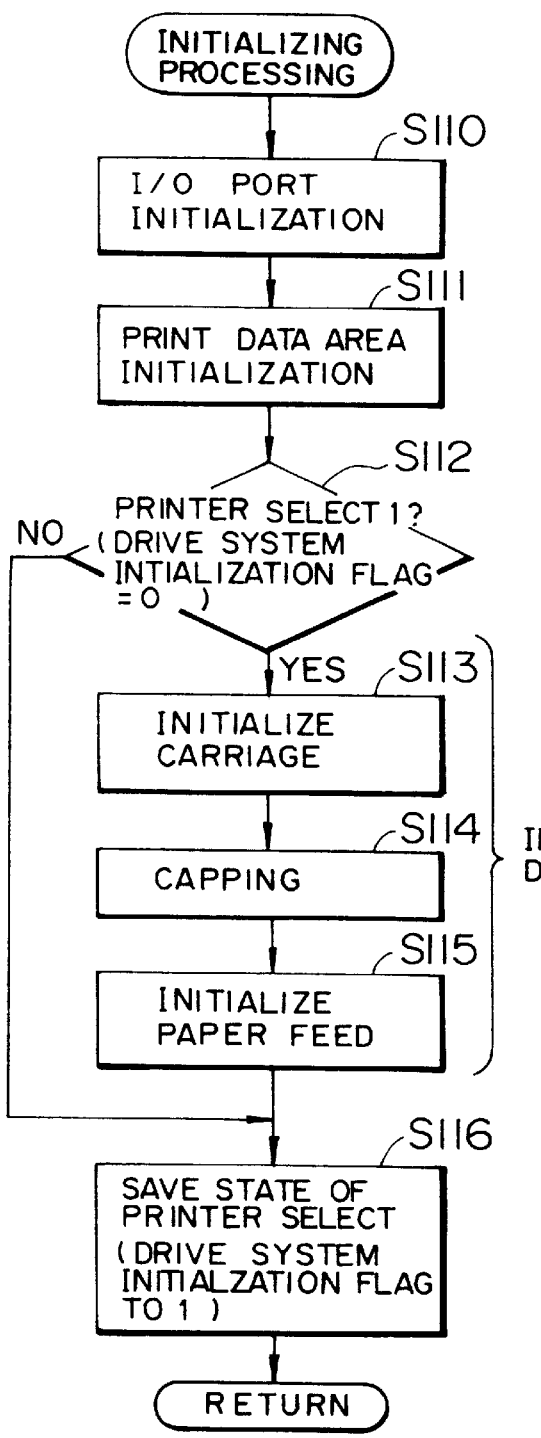
FIG. 28 is a flow chart for controlling the initialization of the printer unit.

FIG. 28 is a flow chart which illustrates step S100 shown in FIG. 27 in detail. First, the I/O port of the printer drive system is initialized in step S110, and the print data area shown in FIG. 21 is initialized in step S111. Then, the printer selector shown in FIG. 12 is discriminated (S112). If the printer is selected (in a case of 1), the drive system (the carriage, the capping and paper feeding) is initialized in steps S113 to S115. If the printer selector is 0, that is, if the printer is selected, steps S113 to S115 are skipped.

Figure 33:
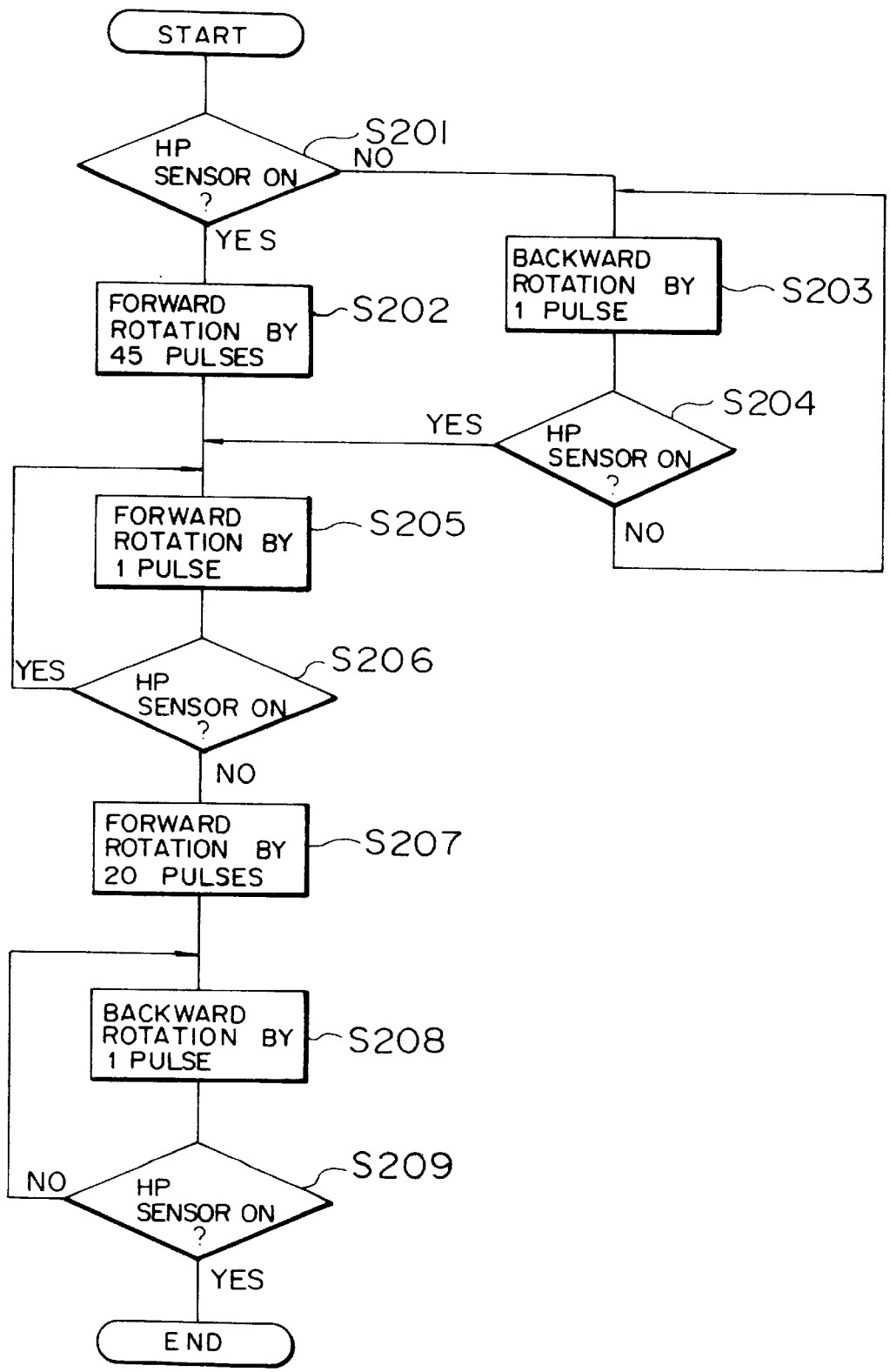
FIG. 33 is a detailed flow chart of the carriage initializing process.

The carriage initializing process in step S113 is performed in such a manner that the carriage 5014 shown in FIG. 3 is moved, the presence of the carriage 5014 is confirmed by the photocouplers 5007 and 5008, and the carriage 5014 is brought to the home position. The aforesaid process is shown in FIG. 33 in detail.

Figure 34:
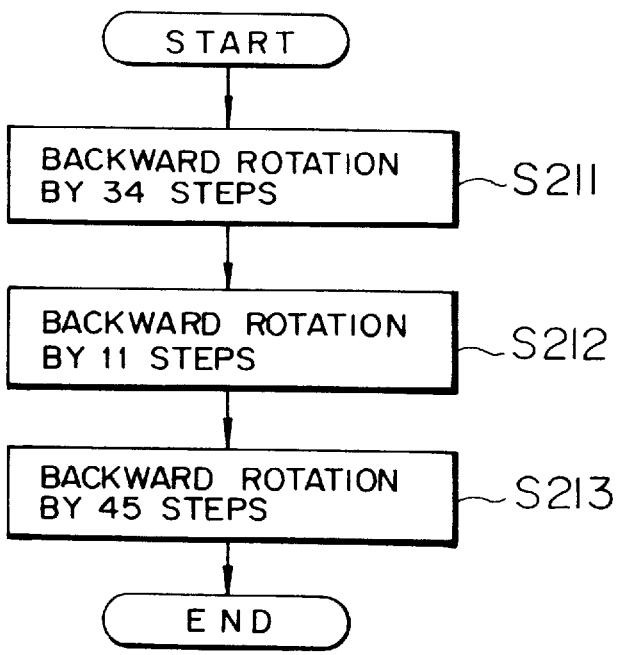
FIG. 34 is a detailed flow chart of a capping process.

Then, capping is performed (S114). The capping process is an operation for capping the front surface of the recording head 5012 with the capping member 5022 shown in FIG. 3, so that the recording head 5012 is protected from drying. The recording head 5012 must be capped with the capping member 5022 except for a period in which the printing operation is performed. The capping operation is shown in FIG. 34 to be described later.

Then, the paper feed is initialized (S115). The paper feed initialization is a process of initializing the paper feeding motor 5024 to be performed in order to determine the print line position. According to this embodiment, the detailed description is omitted here.

In next step S116, the state (0 or 1) of the printer select at this time is stored in the No. 2 RAM (omitted from illustration), and the process is completed here. The fact that the select state is 0 is meant a fact that the initialization of the drive system has not been performed. The aforesaid state can be considered to be the initializing flag for the drive system shown in FIG. 21.

FIG. 29 is a flow chart which illustrates step S101 shown in FIG. 27 in detail. First, the emulation No. set to the emulation flag EMFLAG shown in FIG. 22 is derived in step S120. The emulation flag EMFLAG shown in FIG. 22 has B0 to B1 in which the emulation No. is set. Then, the flow proceeds to step S121 in which the a corresponding emulation control table is selected from the emulation selection table which corresponds to the emulation No. of the emulation flag EMFLAG. Then, the pointer for the emulation program is derived from the selected emulation control table. Then, the flow proceeds to step S122 in which the flow is branched to the forward portion of the program address derived in step S121 so that each emulation program is executed. As a result of the aforesaid process, the emulation selection process is executed and an emulation is selected.

Figure 30:
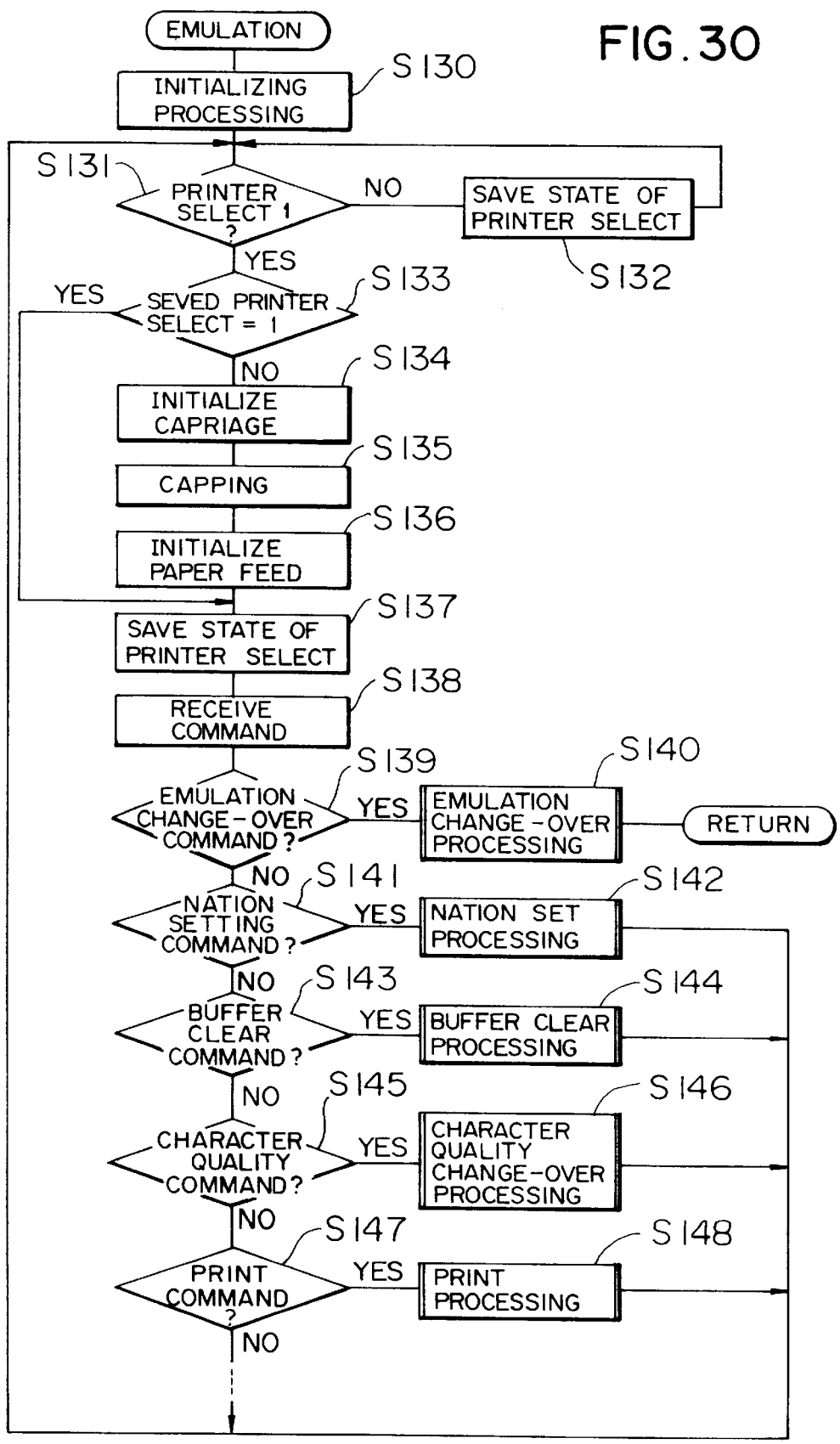
FIG. 30 is a detailed flow chart of steps S102 to S104 shown in FIG. 27.

FIG. 30 is a flow chart which illustrates the emulation to be performed in steps S102 to S104 shown in FIG. 27, where the common portions to all of the emulations are illustrated. First, initialization and the like of data area required for the emulation is executed in step S130. In next step S131, a discrimination is made as to whether or not the printer has been selected. If a discrimination of 0 (the printer has not been selected) is made, the state of 0 is stored in the No. 2 RAM. In step S131, the state where the printer select becomes 1 (printer selection) is waited for. If a state of 1 is realized, the flow proceeds to step S133 in which whether or not the printer selector is 1 as it is and whether or not the same has been changed from 0 to 1 is discriminated from the stored state of the printer selector. If the same is 1 as it is, steps S134 to S136 are skipped. If the same has been changed from 0 to 1, steps S134 to S136 are executed. The processes in steps S134 to S136 are initializing processes of the printer drive system which are the same as those of the processes in steps S113 to S115 shown in FIG. 28. In step S137, the printer select state (1) is stored.

Then, the flow proceeds to step S138 in which a print command is received from the supplied print command and print data. The print data supplied from the body is temporarily stored in the receiving buffer and data is derived from the receiving buffer. If no data is received, the process is completed here as a state where there is no data. Then, the process proceeds to step S139 in which whether or not the subject command is the emulation change-over command is discriminated. If the subject command is the emulation change-over command, the flow proceeds to step S140 in which the emulation change over process is executed. The emulation change-over process is performed in accordance with a detailed flow chart shown in FIG. 31. Then, the flow returns. If the subject command is not the emulation change-over command, the flow proceeds to step S141 in which whether or not the subject command is the nation setting command is discriminated. If the subject command is the nation setting command, the flow proceeds to step S142 in which the nation setting process is executed. The nation setting process is performed in accordance with a detailed flow chart shown in FIG. 32. After the aforesaid process has been completed, the flow returns to a a command receiving process. If the subject command is not the nation setting command, a process of executing another command is performed.

Then, a discrimination is made whether or not the subject command is a buffer clear command. If it is the buffer clear command, the flow proceeds to step S143 in which the buffer clear process (S144) is executed. After the buffer clear process has been executed, the flow returns to the command receiving process. If it is not the buffer clear command, whether or not the subject command is a character grade setting command is discriminated (S145). If it is the character grade setting command, the flow proceeds to step S146 in which the character grade setting process is performed. Then, the flow returns to the command receiving process.

Then, a discrimination is made (step S147) as to whether or not the subject command is a printing command such as a CR (print restoring) or an FF (page breakage). If the subject command is the print command, the flow proceeds to step S148 in which the printing process is executed. Although the description about processing of another command is omitted here, an ordinary emulation command can be executed. After each command has been executed, the flow proceeds to step S131 in which the aforesaid process is repeated.

As a result, the emulation change-over command and the nation setting command can be processed during the emulation process.

Figure 31:
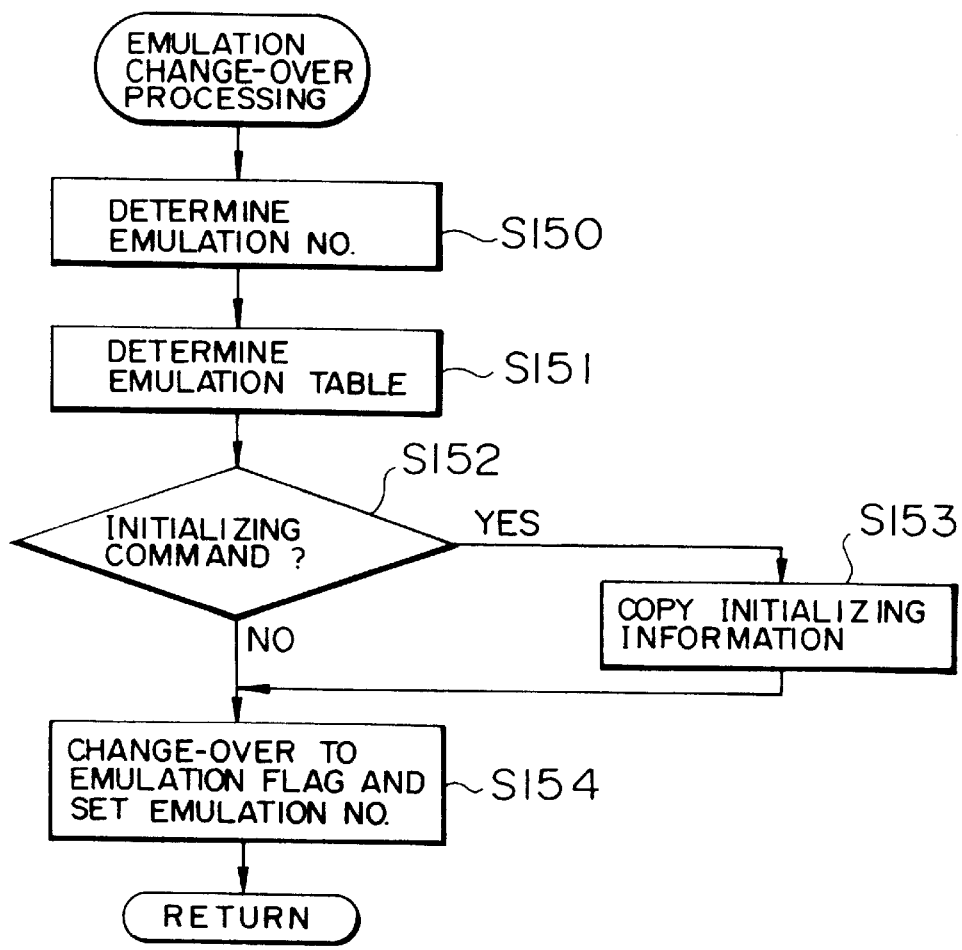
FIG. 31 is a detailed view which illustrates a process of changing over the emulation.

FIG. 31 illustrates the emulation change-over process in detail, the emulation change-over process being executed when the change-over command is received. In step S150, the change-over emulation No. is determined, the change-over emulation No. being received while being added to the change-over command. In next step S151, the emulation control table is determined from the received emulation No. Then, a discrimination is made as to whether or not the change-over command is a command with the initialization (step S152). The change-over command is classified into two types of commands composed of a command with the initialization and a command with no initialization. If the subject command is the command with the initialization, the flow proceeds to step S153 in which initial information is copied to the emulation information area, and the flow proceeds to step S154. If the subject command is a command with no initialization, the flow proceeds to step S154. In step S154, the emulation No. changed over to the emulation flag EMFLAG is set to bits B0 to B1. Then, the flow returns.

As a result of the aforesaid process, the emulation change-over process is executed and a preparation for the emulation change-over can be performed.

Figure 32:
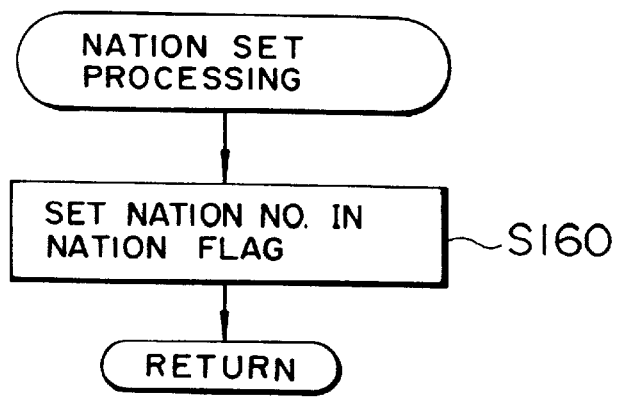
FIG. 32 is a detailed view which illustrates a nation setting process.

FIG. 32 illustrates the nation setting process in detail, the nation setting process being executed when a nation setting command is received. First, the Nation No. is set to nation flag CNTFLAG in step S160. Then, the flow returns. As a result of the above-mentioned process, the nation setting process is executed so that the nation is set.

FIG. 33 is a detailed flow chart which illustrates the carriage initializing process. Then, the description will be made with reference to FIG. 3. A fact whether or not the carriage 5014 is positioned in the home position region can be detected because the lever 5006 added to the carriage 5014 traverses the photocouplers 5007 and 5008 (the HP sensor) (when the HP sensor is actuated). The position at which the HP sensor has been turned on is the home position (HP).

First, a discrimination is made in step S201 as to whether or not the carriage 5014 has been positioned in the home position region. If the same has been positioned in the home position region, the flow proceeds to step S202 in which the drive motor 5013 is rotated in the forward direction by a degree corresponding to 45 pulses (the carriage 5014 is moved by a degree corresponding to 45 pulses to the right) so as to move the carriage 5014 to a position outside the home position region. If a discrimination is made that the HP sensor is not turned on in step S201, the flow proceeds to steps S203 and S204 in which the drive motor 5013 is rotated reversely by a degree corresponding to one pulse (the carriage 5014 is moved to the left by a degree corresponding to one pulse) so as to bring the carriage 5014 into the home position region. In steps S205 and S206, the carriage 5014 is moved to the right by a degree corresponding to one pulse until the HP sensor is turned off. In step S207, the carriage is further moved to the right by a degree corresponding to 20 pulses. In each of next steps S208 and S209, the carriage 5014 is moved to the left by a degree corresponding to one pulse. When the HP sensor is turned on, the movement of the carriage 5014 is stopped and the initialization is completed.

FIG. 34 is a detailed flow chart which illustrates the capping process. The capping operation is controlled by the No. 2 CPU shown in FIG. 4. When the drive motor 5013 is reversely rotated at the home position for the carriage 5014, a power transmission gear is changed over so as to move the lever 5021 via the cam 5020. In order to move the lever 5021 to the capping position, the following three control operations (S211 to S213) must be performed as the flow of the capping operation: If the carriage 5014 is positioned at the home position, the drive motor 5013 is reversely rotated by a degree of 34 steps and the drive transmission gears 5010 and 5011 are changed over (S211). Then, the drive motor 5013 is further rotated reversely by 11 steps, and the capping member 5022 is temporarily moved away from the recording head 5012 (S212). Then, the drive motor 5013 is rotated by 45 steps so as to cause the capping member 5022 to abut against the surface of the recording head 5012. Thus, the capping process is completed here (S213).

By reversely performing the above-mentioned process, the cap can be opened.

[Another Embodiment]

Another embodiment is so arranged that each component element (the carriage system, the capping system and the paper feeding system) of the printing apparatus has the initializing flag so as to precisely perform the initialization control. The detailed structure is arranged similarly to the first embodiment and therefore the description is omitted here.

As described above, the unnecessary initialization of the printing apparatus at the time of the power supply can be omitted according to the present invention, and therefore the operation can be performed smoothly.

If the present invention is employed in a battery-driven information processing apparatus including a printing apparatus, a significant effect can be obtained in that the life of the battery can be lengthened.

Figure 35:
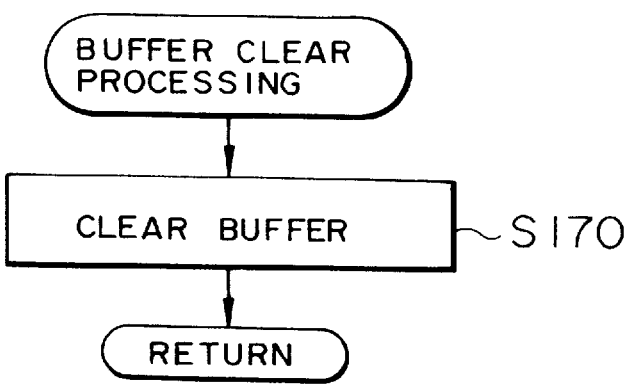
FIG. 35 is a detailed view which illustrates a buffer clear process.

FIG. 35 illustrates the buffer clear process in detail, the buffer clear process being executed when the buffer clear command is received. First, in step S170, the buffer is cleared, the buffer including buffers such as the print buffer which must be initialized. As a result, the buffer clear process is performed.

Figure 36:
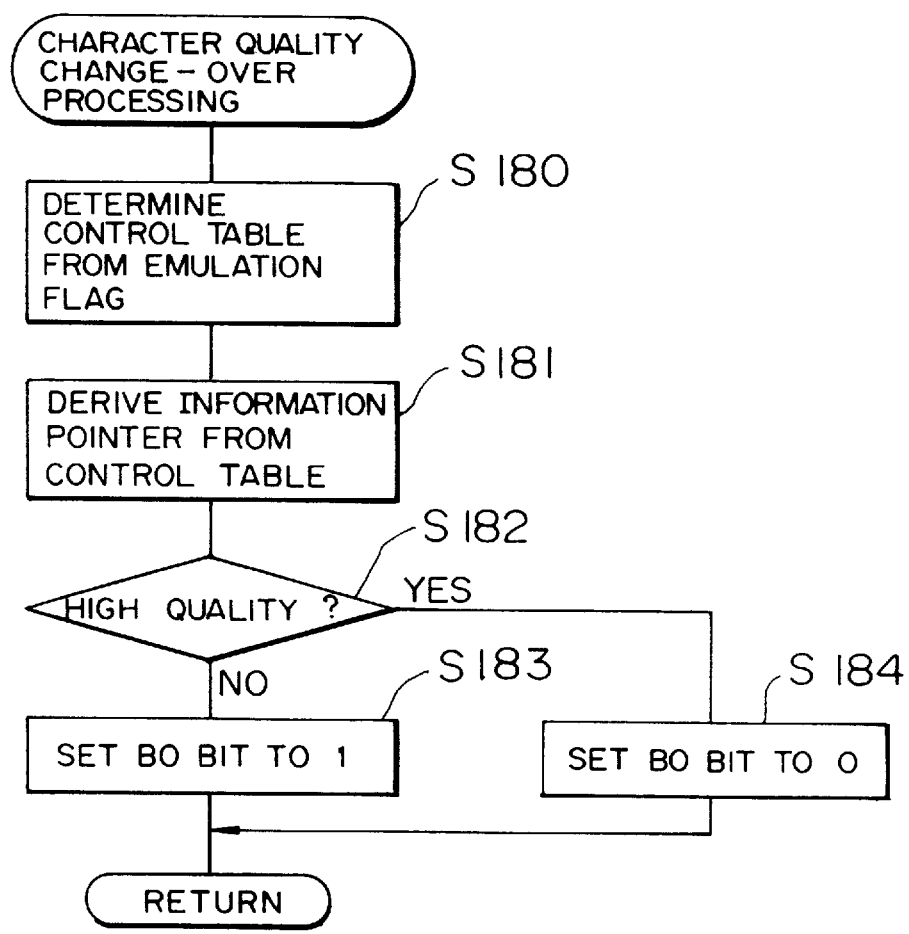
FIG. 36 is a detailed view which illustrates a character quality changing-over process.

FIG. 36 illustrates the character grade change-over process in detail, the character grade change-over process being executed when a character grade change-over command is received. First, in step S180, the emulation No. set to the emulation flag EMFLAG is derived. Then, the address of the emulation control table registered to the emulation selection table is determined from the aforesaid emulation No. In next step S181, the address registered to the information pointer in the control table determined in step S180 is derived. The address indicates the emulation information which is stored in the RAM. Then, the flow proceeds to step S182 in which whether or not setting to the high grade is made is discriminated, this discrimination being made with a value included in the command and indicating the high grade or draft grade. If the high grade is instructed, the flow proceeds to step S184 in which the B0 bit of the emulation information is made to be zero. The fact that the B0 bit is made to be zero means that the high grade is instructed. If the high grade is not instructed, the flow proceeds to step S183 in which the B0 bit of the emulation information is made to be 1. The fact that the B0 bit is made to be 1 means that the draft grade is instructed. Then, the flow return operation is performed. As a result of the above-mentioned process, the character grade change-over command is executed and the grade is selected in the ensuing process in accordance with the B0 bit of the emulation information when the printing operation is executed.

Figure 37:
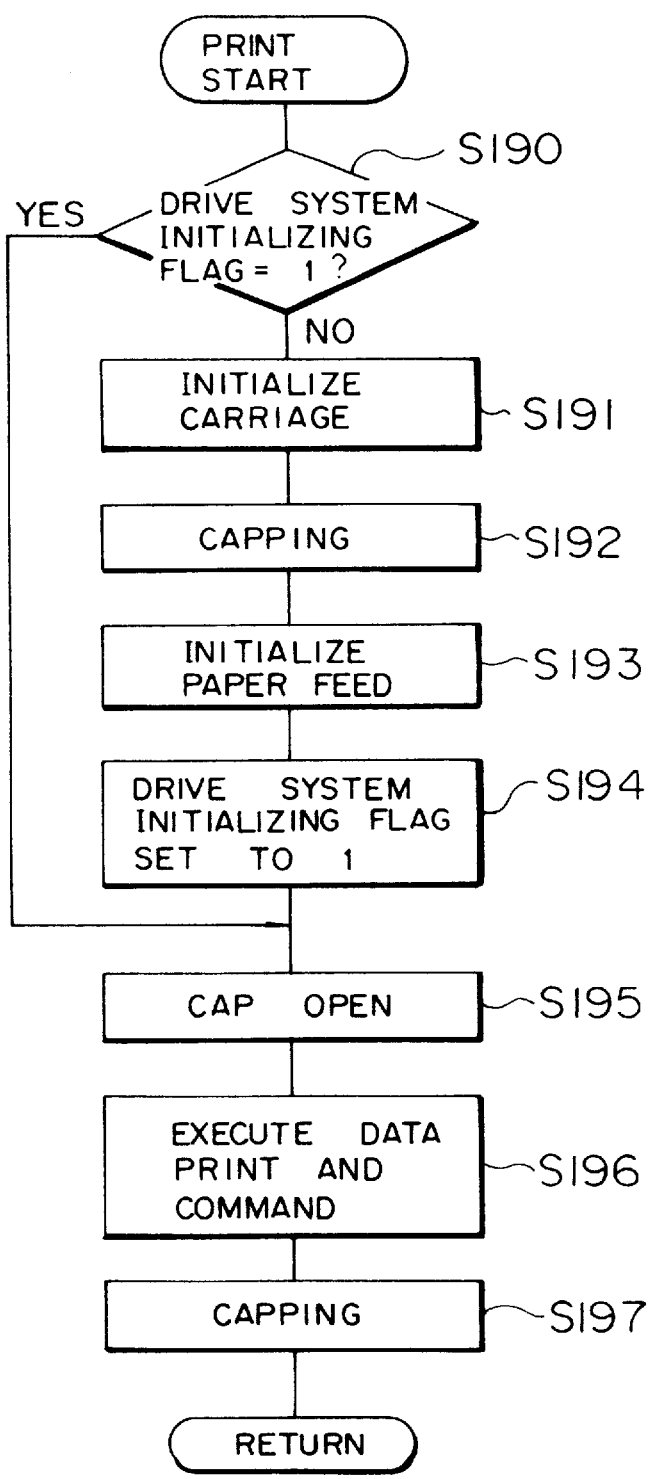
FIG. 37 is a detailed flow chart of step S141 shown in FIG. 30.
Figure 5:
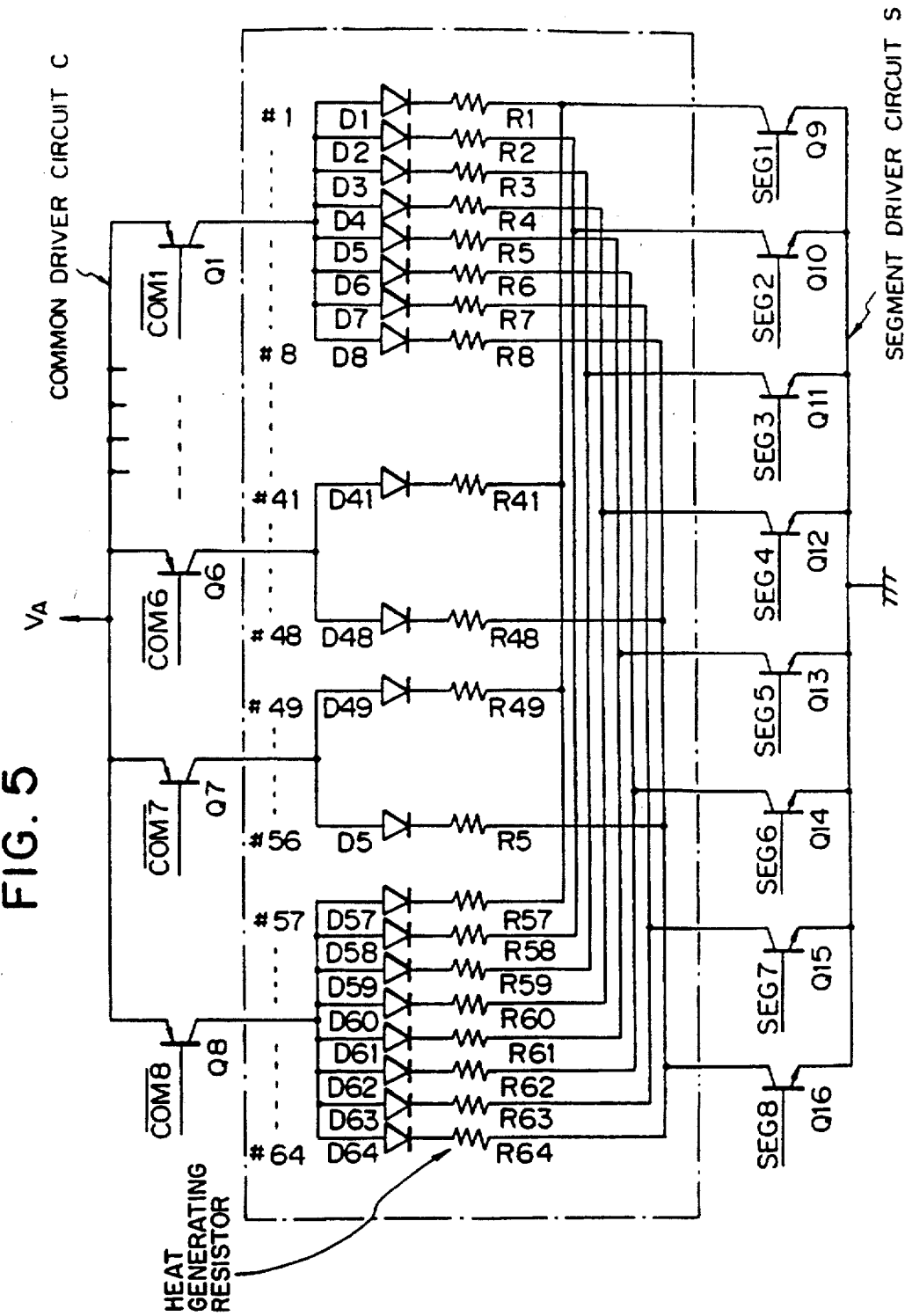

FIG. 37 is a flow chart which illustrates step S141 shown in FIG. 30 in detail. First, the drive system initializing flag is tested in step S190 in which the printer drive system such as the carriage has been initialized is discriminated. If the flag 0 has not been initialized, the initializing steps S191 to S194 are executed.

The carriage initializing process in step S191 is an operation in which the carriage 5014 shown in FIG. 3 is moved, the presence of the carriage 5014 is confirmed by the photocouplers 5007 and 5008, and the carriage 5014 is brought to the home position. The aforesaid operation is illustrated in FIG. 33 in detail.

Then, the capping operation is performed (S192) which is an operation for capping the front surface of the recording head 5012 with the capping member 5022 shown in FIG. 3 in order to prevent the recording head 5012 from drying. The recording head 5012 must be capped with the capping member 5022 in a period except for the period in which the printing operation is performed.

The capping operation is in detail illustrated in FIG. 34.

Then, the paper feed initializing operation is performed (S193). The paper feed initializing operation is an operation for initializing the paper feeding motor 5024 in order to determine the print line position. The detailed description of the paper feed initializing operation is omitted here.

In order to indicate that the initialization has been completed, setting to the drive system initializing flag 1 is made. In the ensuing printing operation, steps S191 to S194 are skipped.

In step S195, the cap is opened, and in step S196, the carriage, the recording head and the like are driven so that the print data in the print data area is printed and a command which commences the printing operation is executed. After the command has been executed, the carriage is again returned in step S197, and the capping operation is performed. Thus, the printing process is completed.

As described above, according to the present invention, the initialization of the printing apparatus can be omitted at the time of the power supply or the change in the emulation mode. Therefore, the printing operation can be performed smoothly.

If the present invention is employed in a battery-driven information processing apparatus including a printing apparatus, a significant effect can be obtained in that the life of the battery can be lengthened.

As described above, according to the present invention, there is provided a printing method and an apparatus in which the aforesaid initializing operation is performed prior to performing the printing operation by receiving data to be printed from the host when a print opportunity has been issued in a state where the initialization of printing has not been made.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A printing apparatus comprising:
    printing means for receiving and printing data supplied from a host;
    storage means, connected to said printing means through a general-purpose interface, for storing an indication of whether or not an initialization of said printing means has been performed;
    initializing means which discriminates the indication of said storage means so as to perform said initialization prior to performing printing if said initialization has not been performed and a printing instruction has been issued by the host; and means for initializing of a memory area of said printing means regardless of the indication stored by said storage means.

2. A printing apparatus according to claim 1, wherein said printing means comprises a plurality of component elements and a plurality of component element storage means corresponding to said component elements.

3. A printing apparatus according to claim 1, wherein said host and said printing means are connected to each other via a general-purpose parallel interface.

4. A printing apparatus according to claim 1, wherein said printing means causes a volume of an ink source to be changed due to an increase of thermal energy of ink of the ink source so as to discharge an ink droplet through a discharge port.

5. A printing apparatus according to claim 1, wherein said storage means is connected to said printing means through a general-purpose parallel interface.

6. A printing method comprising the steps of:

storing, in storing means connected to a printing unit through a general-purpose interface, an indication of whether or not initialization of said printing unit required to perform a printing operation instructed by a host has been performed;

performing said initialization prior to performing the printing operation if said initialization is indicated as not having been performed and the printing operation has been instructed by said host; and initializing a memory area of the printing unit regardless of the indication stored in said storing step by said storing means.

7. A printing method according to claim 6, wherein said host and said printing unit are connected to each other via a general-purpose parallel interface.

8. A printing method according to claim 6, wherein said printing operation is performed by causing a volume of an ink source to be changed due to an increase of thermal energy of ink of the ink source so as to discharge an ink droplet through a discharge port.

9. A computer usable medium storing a computer readable program, the program comprising:

means for instructing a computer to store in storing means an indication of whether a printer has been initialized, wherein initialization of the printer is required for the printer to perform a printing operation in response to instructions from a host, and wherein the storing means is connected to the printer through a general-purpose interface;

means for instructing the computer to initialize the printer before printing if the storing means stores an indication that the printer has not been initialized and the host has instructed the printer to print; and means for instructing the computer to initialize a memory area of the printer regardless of the indication stored in the storing means.

10. A computer usable medium according to claim 9, wherein the printer comprises a plurality of component elements and a plurality of component-element storage means corresponding to said component elements, wherein said program further comprises means for instructing the computer to control the plurality of component elements and the plurality of component element storage means corresponding to said component elements.

11. A computer usable medium according to claim 9, wherein the program further comprises means for instructing the computer to instruct the host to control the printer through a general-purpose parallel interface connecting the host and the printer.

12. A computer usable medium according to claim 9, wherein the program further comprises means for instructing the printer to cause a volume of an ink source to be changed due to an increase in thermal energy of ink of the ink source so as to discharge an ink droplet through a discharge port.

13. A computer usable medium according to claim 9, wherein the program further comprises means for instructing the computer to use an I/O register when controlling the printer.

* * * * *

UNITED STATES PATENT AND TRADEMARK OFFICE
CERTIFICATE OF CORRECTION

PATENT NO. : 5,838,886

DATED : November 17, 1998

INVENTOR(S) : TSUTOMU TAKAHASHI ET AL.

It is certified that error appears in the above-identified patent and that said Letters Patent is hereby corrected as shown below:

Title page, item
[22] FILED

"Sep. 30, 1992" should read --July 30, 1992--.

SHEET 5

Replace Fig. 5 with amended Fig. 5 attached.

SHEET 24

Figure 30, "SEVED" should read --SAVED--; and "Capriage" should read --CARRIAGE--.

COLUMN 2

Line 24, "illustrate" should read --illustrates--.

COLUMN 4

Line 43, "it" should read --it performs--.
Line 44, "the" should read --of the--.

COLUMN 6

Line 34, "illustrate" should read --illustrates--.
Line 45, "inter face" should read --interface--.

Signed and Sealed this

Sixteenth Day of November, 1999

Attest:

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,838,886

DATED : November 17, 1998

INVENTOR(S) : TSUTOMU TAKAHASHI ET AL.

It is certified that error appears in the above-identified patent and that said Letters Patent is hereby corrected as shown below:

COLUMN 8

Line 63, "illustrate" should read --illustrates--.

COLUMN 10

Line 49, "2," (first occurrence) should read --1,--.

COLUMN 12

Line 58, "a" should be deleted.

COLUMN 13

Line 29, "change over" should read --change-over--.
   Line 40, "a a" should read --a--.